(12) United States Patent
Isobe et al.

(10) Patent No.: US 8,094,996 B2
(45) Date of Patent: Jan. 10, 2012

(54) RECORDING APPARATUS, RECORDING METHOD, RECORDING PROGRAM, IMAGE PICKUP APPARATUS, IMAGE PICKUP METHOD, AND IMAGE PICKUP PROGRAM

(75) Inventors: Yukio Isobe, Kanagawa (JP); Kenichiro Aridome, Kanagawa (JP); Naoki Morimoto, Tokyo (JP); Atsushi Mae, Kanagawa (JP); Tetsuhiro Maeda, Kanagawa (JP)

(73) Assignee: Sony Corporation (JP)

( * ) Notice: Subject to any disclaimer, the term of this patent is extended or adjusted under 35 U.S.C. 154(b) by 1107 days.

(21) Appl. No.: 11/919,712

(22) PCT Filed: Apr. 24, 2007

(86) PCT No.: PCT/JP2007/059345
§ 371 (c)(1),
(2), (4) Date: Oct. 29, 2007

(87) PCT Pub. No.: WO2007/129652
PCT Pub. Date: Nov. 15, 2007

(65) Prior Publication Data
US 2009/0317067 A1   Dec. 24, 2009

(30) Foreign Application Priority Data
May 10, 2006   (JP) .............................. P2006-131909

(51) Int. Cl.
*H04N 5/89* (2006.01)
*H04N 5/92* (2006.01)
*H04N 9/80* (2006.01)

(52) U.S. Cl. ........ 386/335; 386/336; 386/337; 386/338; 386/241; 386/248

(58) Field of Classification Search .................. 386/335, 386/336, 337, 338, 241, 248
See application file for complete search history.

(56) References Cited

U.S. PATENT DOCUMENTS
5,771,334 A * 6/1998 Yamauchi et al. ............ 386/239
(Continued)

FOREIGN PATENT DOCUMENTS
JP   11-317014 A   11/1999
(Continued)

*Primary Examiner* — Helen Shibru
(74) *Attorney, Agent, or Firm* — Lerner, David, Littenberg, Krumholz & Mentlik, LLP

(57) ABSTRACT

Recording of video data is enabled by a management structure of a clip which is compatible with a BD-ROM standard. In accordance with the recording starting operation, the recording of a stream in which the video data and audio data have time-divisionally been multiplexed on a packet unit basis onto a recording medium is started. In accordance with the recording stopping operation, the stream stored in a buffer is written as a stream file onto the recording medium and a clip information file corresponding to the stream file is formed. A play item showing the whole clip information file is formed and added to the existing play list on the recording medium. A mark is stamped to the play list at time corresponding to an IN point of the play item. Subsequently, the play item which is formed in association with the recording start and stop is similarly further added to the existing play list and the mark is further stamped at the time corresponding to the IN point.

17 Claims, 35 Drawing Sheets

U.S. PATENT DOCUMENTS

| | | | |
|---|---|---|---|
| 6,009,433 A * | 12/1999 | Kurano et al. | 1/1 |
| 6,269,063 B1 | 7/2001 | Fujinami et al. | |
| 7,835,615 B2 * | 11/2010 | Itoh et al. | 386/241 |
| 7,912,338 B2 * | 3/2011 | Seo et al. | 386/241 |
| 7,991,270 B2 * | 8/2011 | Yahata et al. | 386/248 |
| 2002/0131761 A1 | 9/2002 | Kawasaki et al. | |
| 2005/0063669 A1 | 3/2005 | Kato et al. | |
| 2005/0191032 A1 * | 9/2005 | Seo et al. | 386/69 |
| 2009/0123128 A1 * | 5/2009 | Shimada | 386/95 |

FOREIGN PATENT DOCUMENTS

| | | |
|---|---|---|
| JP | 2002-290917 A | 10/2002 |
| JP | 2003-230104 A | 8/2003 |
| JP | 2004-350251 A | 12/2004 |
| JP | 2005-216382 A | 8/2005 |
| JP | 2005-353212 A | 12/2005 |

* cited by examiner

Fig. 6

| SYNTAX | DATA LENGTH (BITS) | MNEMONIC |
|---|---|---|
| Index table file { | | |
|     TypeIndicator | 8 * 4 | bslbf |
|     TypeIndicator2 | 8 * 4 | bslbf |
|     IndexesStartAddress | 32 | uimsbf |
|     ExtensionDataStartAddress | 32 | uimsbf |
|     reserved | 192 | bslbf |
|     blkAppInfoBDMV() | | |
|     for (i=0; i<N1; i++) { | | |
|         padding_word | 16 | bslbf |
|     } | | |
|     blkIndexes() | | |
|     for (i=0; i<N2; i++) { | | |
|         padding_word | 16 | bslbf |
|     } | | |
|     blkExtensionData() | | |
|     for (i=0; i<N3; i++) { | | |
|         padding_word | 16 | bslbf |
|     } | | |
| } | | |

Fig. 7

| SYNTAX | DATA LENGTH (BITS) | MNEMONIC |
|---|---|---|
| blkIndexes() { | | |
|     Length | 32 | uimsbf |
|     FirstPlaybackTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         FirstPlaybackTitleMobjIDRef | 16 | uimsbf |
|         reserved | 32 | bslbf |
|     } | | |
|     MenuTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         MenuTitleMobjIDRef | 16 | uimsbf |
|         reserved | 32 | bslbf |
|     } | | |
|     NumberOfTitles | 16 | uimsbf |
|     for (title_id=0; title_id < NumberOfTitles; title_id++) { | | |
|         MovieTitle[title_id]() { | | |
|             reserved | 1 | bslbf |
|             '1' | 1 | bslbf |
|             reserved | 46 | bslbf |
|             MovieTitleMobjIDRef[title_id] | 16 | uimsbf |
|             reserved | 32 | bslbf |
|         } | | |
|     } | | |
| } | | |

Fig. 8

| SYNTAX | DATA LENGTH (BITS) | MNEMONIC |
|---|---|---|
| MovieObject file { | | |
|     TypeIndicator | 8 * 4 | bslbf |
|     TypeIndicator2 | 8 * 4 | bslbf |
|     ExtensionDataStartAddress | 32 | uimsbf |
|     reserved | 224 | bslbf |
|     blkMovieObjects() | | |
|     for (i=0; i<N1; i++) { | | |
|         padding_word | 16 | bslbf |
|     } | | |
|     blkExtensionData() | | |
|     for (i=0; i<N2; i++) { | | |
|         padding_word | 16 | bslbf |
|     } | | |
| } | | |

Fig. 9

| SYNTAX | DATA LENGTH (BITS) | MNEMONIC |
|---|---|---|
| blkMovieObjects() { | | |
|     Length | 32 | uimsbf |
|     reserved | 32 | bslbf |
|     NumberOfMobjs | 16 | uimsbf |
|     for (mobj_id=0; mobj_id<NumberOfMobjs; mobj_id++) { | | |
|         MovieObject[mobj_id]() { | | |
|             TerminalInfo() { | | |
|                 '1' | 1 | bslbf |
|                 reserved | 15 | bslbf |
|                 NumberOfNavigationCommands[mobj_id] | 16 | uimsbf |
|                 for (command_id=0; command_id<NumberOfNavigationCommands[mobj_id]; command_id++){ | | |
|                       NavigationCommand[mobj_id][command_id] | 96 | bslbf |
|                 } | | |
|         } | | |
|     } | | |
| } | | |

Fig. 10

| SYNTAX | DATA LENGTH (BITS) | MNEMONIC |
|---|---|---|
| Movie PlayList file { | | |
|     TypeIndicator | 8 * 4 | bslbf |
|     TypeIndicator2 | 8 * 4 | bslbf |
|     PlayListStartAddress | 32 | uimsbf |
|     PlayListMarkStartAddress | 32 | uimsbf |
|     ExtensionDataStartAddress | 32 | uimsbf |
|     reserved | 160 | bslbf |
|     blkAppInfoPlayList() | | |
|     for (i=0; i<N1; i++) { | | |
|         padding_word | 16 | bslbf |
|     } | | |
|     blkPlayList() | | |
|     for (i=0; i<N2; i++) { | | |
|         padding_word | 16 | bslbf |
|     } | | |
|     blkPlayListMark() | | |
|     for (i=0; i<N3; i++) { | | |
|         padding_word | 16 | bslbf |
|     } | | |
|     blkExtensionData() | | |
|     for (i=0; i<N4; i++) { | | |
|         padding_word | 16 | bslbf |
|     } | | |
| } | | |

Fig. 11

| SYNTAX | DATA LENGTH (BITS) | MNEMONIC |
|---|---|---|
| blkPlayList() { | | |
|     Length | 32 | uimsbf |
|     reserved | 16 | bslbf |
|     NumberOfPlayItems | 16 | uimsbf |
|     NumberOfSubPaths | 16 | uimsbf |
|     for(PlayItem_id=0;<br>        PlayItem_id<NumberOfPlayItems; PlayItem_id++) { | | |
|         blkPlayItem() | | |
|     } | | |
|     for(SubPath_id=0;<br>        SubPath_id<NumberOfSubPaths; SubPath_id++) { | | |
|         blkSubPath() | | |
|     } | | |
| } | | |

Fig. 12

| SYNTAX | DATA LENGTH (BITS) | MNEMONIC |
|---|---|---|
| blkPlayItem() { | | |
|     Length | 16 | uimsbf |
|     ClipInformationFileName | 8 * 5 | bslbf |
|     ClipCodecIdentifier | 8 * 4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if (StillMode== 0x01){ | | |
|         StillTime | 16 | uimsbf |
|     } else { | | |
|         reserved | 16 | bslbf |
|     } | | |
|     blkSTNTable() | | |
| } | | |

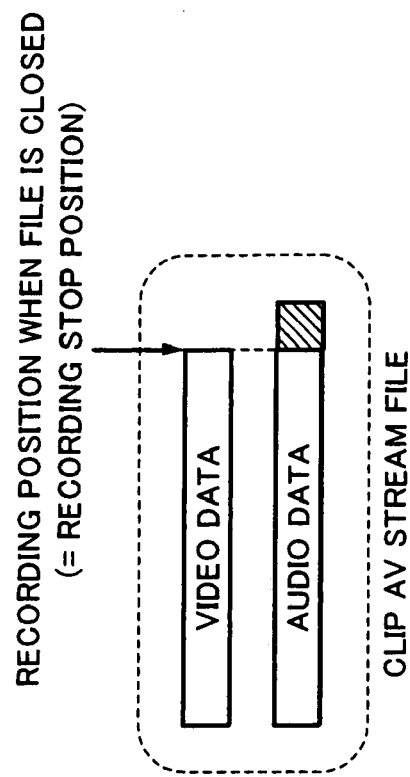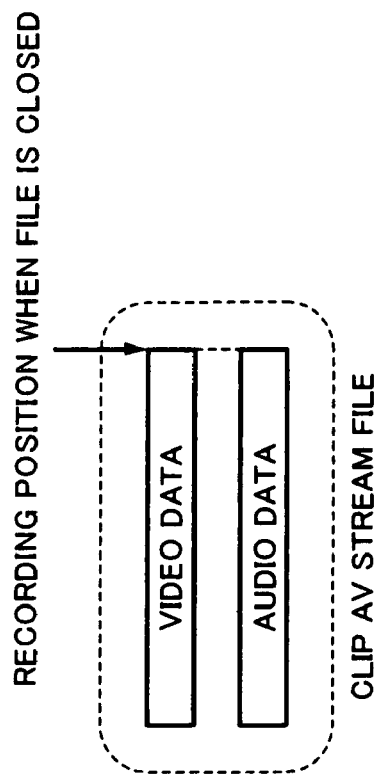
Fig. 13A
Fig. 13B

Fig. 14

| SYNTAX | DATA LENGTH (BITS) | MNEMONIC |
|---|---|---|
| blkPlayListMark() { | | |
|     Length | 32 | uimsbf |
|     NumberOfPlayListMarks | 16 | uimsbf |
|     for(PL_mark_id=0;<br>        PL_mark_id< NumberOfPlayListMarks;<br>        PL_mark_id++) { | | |
|         reserved | 8 | bslbf |
|         MarkType | 8 | bslbf |
|         RefToPlayItemID | 16 | uimsbf |
|         MarkTimeStamp | 32 | uimsbf |
|         EntryESPID | 16 | uimsbf |
|         Duration | 32 | uimsbf |
|     } | | |
| } | | |

Fig. 15

| SYNTAX | DATA LENGTH (BITS) | MNEMONIC |
|---|---|---|
| Clip information file { | | |
|     TypeIndicator | 8 * 4 | bslbf |
|     TypeIndicator2 | 8 * 4 | bslbf |
|     SequenceInfoStartAddress | 32 | uimsbf |
|     ProgramInfoStartAddress | 32 | uimsbf |
|     CPIStartAddress | 32 | uimsbf |
|     ClipMarkStartAddress | 32 | uimsbf |
|     ExtensionDataStartAddress | 32 | uimsbf |
|     reserved | 96 | bslbf |
|     blkClipInfo() | | |
|     for (i=0; i<N1; i++) { | | |
|         padding_word | 16 | bslbf |
|     } | | |
|     blkSequenceInfo() | | |
|     for (i=0; i<N2; i++) { | | |
|         padding_word | 16 | bslbf |
|     } | | |
|     blkProgramInfo() | | |
|     for (i=0; i<N3; i++) { | | |
|         padding_word | 16 | bslbf |
|     } | | |
|     blkCPI() | | |
|     for (i=0; i<N4; i++) { | | |
|         padding_word | 16 | bslbf |
|     } | | |
|     blkClipMark() | | |
|     for (i=0; i<N5; i++) { | | |
|         padding_word | 16 | bslbf |
|     } | | |
|     blkExtensionData() | | |
|     for (i=0; i<N6; i++) { | | |
|         padding_word | 16 | bslbf |
|     } | | |
| } | | |

Fig. 16

| SYNTAX | DATA LENGTH (BITS) | MNEMONIC |
|---|---|---|
| blkClipInfo() { | | |
|     Length | 32 | uimsbf |
|     reserved | 16 | bslbf |
|     ClipStreamType | 8 | bslbf |
|     ApplicationType | 8 | bslbf |
|     reserved | 31 | bslbf |
|     IsCC5 | 1 | bslbf |
|     TSRecordingRate | 32 | uimsbf |
|     NumberOfSourcePackets | 32 | uimsbf |
|     reserved | 1024 | bslbf |
|     TSTypeInfoBlock() | | |
|     if (IsCC5 ==1$_b$) { | | |
|         reserved | 8 | bslbf |
|         FollowingClipStreamType | 8 | bslbf |
|         reserved | 32 | bslbf |
|         FollowingClipInformationFileName | 8 * 5 | bslbf |
|         ClipCodecIdentifier | 8 * 4 | bslbf |
|         reserved | 8 | bslbf |
|     } | | |
| } | | |

Fig. 17

| SYNTAX | DATA LENGTH (BITS) | MNEMONIC |
|---|---|---|
| blkSequenceInfo() { | | |
|     Length | 32 | uimsbf |
|     reserved | 15 | bslbf |
|     '1' | 1 | bslbf |
|     SPNATCStart | 32 | uimsbf |
|     NumberOfSTCSequences | 8 | uimsbf |
|     reserved | 8 | uimsbf |
|     for (stc_id=0; stc_id<NumberOfSTCSequences; stc_id++) { | | |
|         PCRPID[stc_id] | 16 | uimsbf |
|         SPNSTCStart[stc_id] | 32 | uimsbf |
|         PresentationStartTime[stc_id] | 32 | uimsbf |
|         PresentationEndTime[stc_id] | 32 | uimsbf |
|     } | | |
| } | | |

*Fig. 18*

| SYNTAX | DATA LENGTH (BITS) | MNEMONIC |
|---|---|---|
| blkProgramInfo() { | | |
|     Length | 32 | uimsbf |
|     reserved | 15 | bslbf |
|     '1' | 1 | bslbf |
|     SPNProgramSequenceStart | 32 | uimsbf |
|     ProgramMapPID | 16 | uimsbf |
|     NumberOfStreamsInPS | 8 | uimsbf |
|     reserved | 8 | bslbf |
|     for (stream_index=0;<br>        stream_index<NumberOfStreamsInPS;<br>        stream_index++) { | | |
|         StreamPID[stream_index] | 16 | uimsbf |
|         blkStreamCodingInfo( stream_index) | | |
|     } | | |
| } | | |

*Fig. 19*

| SYNTAX | DATA LENGTH (BITS) | MNEMONIC |
|---|---|---|
| blkCPI() { | | |
|     Length | 32 | uimsbf |
|     if(Length !=0) { | | |
|         reserved | 12 | bslbf |
|         CPIType | 4 | bslbf |
|         blkEPMap() | | |
|     } | | |
| } | | |

Fig. 20

| SYNTAX | DATA LENGTH (BITS) | MNEMONIC |
|---|---|---|
| blkEPMap(){ | | |
|   reserved | 8 | bslbf |
|   NumberOfStreamPIDEntries | 8 | uimsbf |
|   for (*k=0; k<NumberOfStreamPIDEntries; k++*) { | | |
|     StreamPID[k] | 16 | bslbf |
|     reserved | 10 | bslbf |
|     EPStreamType[k] | 4 | bslbf |
|     NumberOfEPCoarseEntries[k] | 16 | uimsbf |
|     NumberOfEPFineEntries[k] | 18 | uimsbf |
|     EPMapForOneStreamPIDStartAddress[k] | 32 | uimsbf |
|   } | | |
|   for (i=0; i<X; i++) { | | |
|     padding_word | 16 | bslbf |
|   } | | |
|   for (*k=0; k<NumberOfStreamPIDEntries; k++*) { | | |
|     **blkEPMapForOneStreamPID(*EPStreamType[k], NumberOfEPCoarseEntries[k], NumberOfEPFineEntries[k]*)** | | |
|     for (i=0; i<Y[k]; i++) { | | |
|       padding_word | 16 | bslbf |
|     } | | |
|   } | | |
| } | | |

Fig. 21

| SYNTAX | DATA LENGTH (BITS) | MNEMONIC |
|---|---|---|
| blkEPMapForOneStreamPID(*EP_stream_type*, *Nc*, *Nf*) { | | |
|     EPFineTableStartAddress | 32 | uimsbf |
|     for (i=0; i<*Nc*; i++) { | | |
|     // EP coarse table | | |
|         RefToEPFineID*[i]* | 18 | uimsbf |
|         PTSEPCoarse*[i]* | 14 | uimsbf |
|         SPNEPCoarse*[i]* | 32 | uimsbf |
|     } | | |
|     for (i=0; i<X; i++) { | | |
|         padding_word | 16 | bslbf |
|     } | | |
|     for (*EP_fine_id* =0; *EP_fine_id* < *Nf*, *EP_fine_id*++) { | | |
|     // EP fine table | | |
|         ReservedEPFine*[EP_fine_id]* | 1 | bslbf |
|         IEndPositionOffset*[EP_fine_id]* | 3 | bslbf |
|         PTSEPFine*[EP_fine_id]* | 11 | uimsbf |
|         SPNEPFine*[EP_fine_id]* | 17 | uimsbf |
|     } | | |
| } | | |

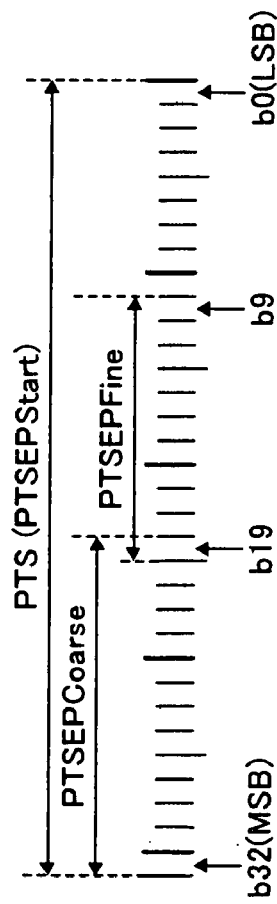

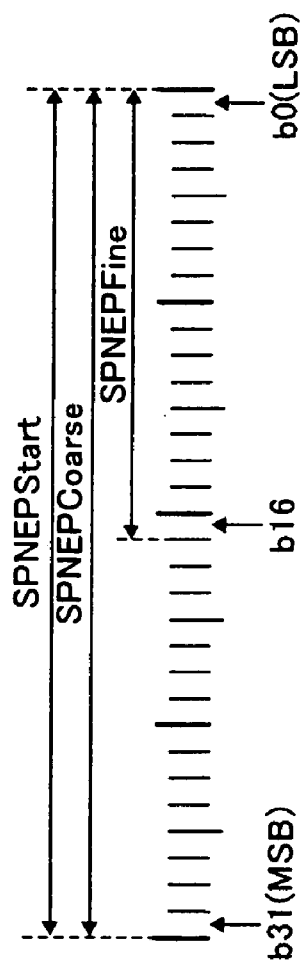

Fig. 24

| SYNTAX | DATA LENGTH (BITS) | MNEMONIC |
|---|---|---|
| blkExtensionData() { | | |
|   Length | 32 | uimsbf |
|   if(Length !=0){ | | |
|     DataBlockStartAddress | 32 | uimsbf |
|     reserved | 24 | |
|     NumberOfExtDataEntries | 8 | uimsbf |
|     for (i=0; i<NumberOfExtDataEntries; i++) { | | |
|       ext_data_entry() { | | |
|         ExtDataType | 16 | uimsbf |
|         ExtDataVersion | 16 | uimsbf |
|         ExtDataStartAddress | 32 | uimsbf |
|         ExtDataLength | 32 | uimsbf |
|       } | | |
|     } | | |
|     for (i=0; i<L1; i++) { | | |
|       padding_word | 16 | bslbf |
|       padding_word | 16 | bslbf |
|     } | | |
|     DataBlock() | 32+ 8 * (Length - DataBlockStartAddress) | |
|   } | | |
| } | | |

Fig. 28

| SYNTAX | DATA LENGTH (BITS) | MNEMONIC |
|---|---|---|
| blkIndexExtensionData(){ | | |
|     TypeIndicator | 8 * 4 | uimsbf |
|     reserved | 8 * 4 | bslbf |
|     TableOfPlayListsStartAddress | 32 | uimsbf |
|     MakersPrivateDataStartAddress | 32 | uimsbf |
|     reserved | 192 | bslbf |
|     blkUIAppInfoAVCHD() | | |
|     for(i=0; i<N1;i++) { | | |
|         padding_word | 16 | bslbf |
|     } | | |
|     blkTableOfPlayLists() | | |
|     for(i=0; i<N2;i++) { | | |
|         padding_word | 16 | bslbf |
|     } | | |
|     blkMakersPrivateData() | | |
|     for (i=0; i<N3;i++){ | | |
|         padding_word | 16 | bslbf |
|     } | | |
| } | | |

Fig. 29

| SYNTAX | DATA LENGTH (BITS) | MNEMONIC |
|---|---|---|
| blkTableOfPlayLists() { | | |
|     Length | 32 | uimsbf |
|     blkFirstPlaybackTitlePlayLists() | | |
|     blkMenuTitlePlayLists() | | |
|     NumberOfTitlePlayListPair | 16 | bslbf |
|     for(i=0; i< NumberOfTitlePlayListPair;i++){ | | |
|         blkMovieTitlePlayListPair() { | | |
|             PlayListFileName | 8 * 5 | bslbf |
|             reserved | 6 | bslbf |
|             PlayListAttribute | 2 | uimsbf |
|             reserved | 16 | bslbf |
|             RefToTitleId | 16 | uimsbf |
|         } | | |
|     } | | |
| } | | |

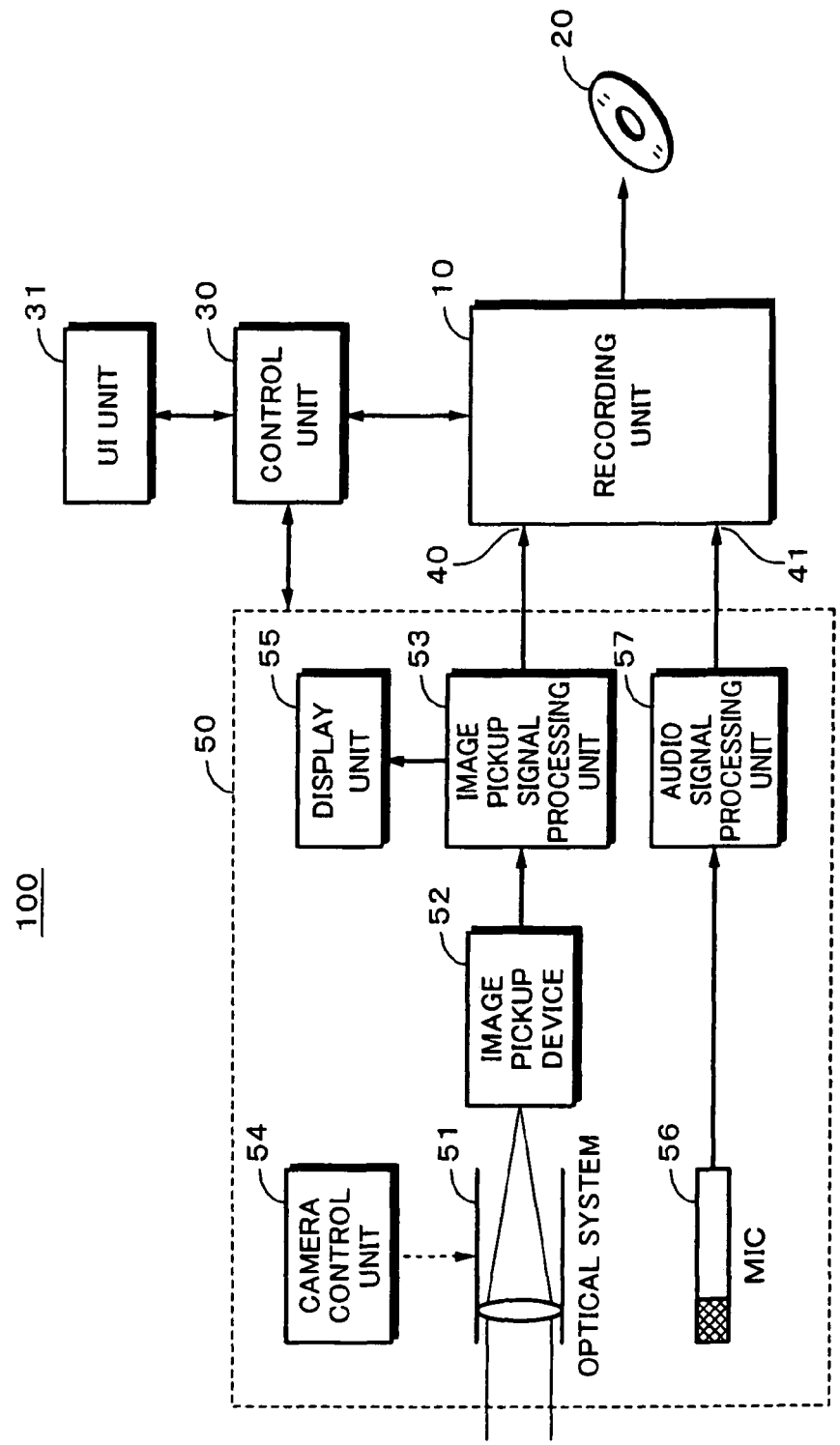

RECORDING APPARATUS, RECORDING METHOD, RECORDING PROGRAM, IMAGE PICKUP APPARATUS, IMAGE PICKUP METHOD, AND IMAGE PICKUP PROGRAM

TECHNICAL FIELD

The invention relates to a recording apparatus, a recording method, a recording program, an image pickup apparatus, an image pickup method, and an image pickup program which are suitable to record stream data in which video data and audio data have been multiplexed onto a recording medium.

BACKGROUND ART

Hitherto, as a recording medium which is recordable and can be removed from a recording and reproducing apparatus and in which a recording capacity is relatively large and which is suitable to record AV (Audio/Video) data having video data and audio data, a DVD (Digital Versatile Disc) having a recording capacity of 4.7 GB (Giga Bytes) or more has been spread. An image pickup apparatus for recording onto the recordable type DVD in a DVD-Video format has been disclosed in Patent Document (JP-A-2004-350251).

In the case of applying such a recording medium having the large recording capacity to a recording apparatus such as a video camera apparatus which frequently repeats start and stop of the recording, such a recording format in which a recorded AV stream can be easily handled by the user, for example, a title management and an edition of the recorded AV stream can be easily performed is demanded.

For example, in a format in which a reproducing interval and reproducing order can be designated for a predetermined unit which needs a continuous synchronous reproduction of the video data and audio data, that is, a reproduction in which a real-time reproduction is guaranteed, an AV stream file as a recorded AV stream of the predetermined unit is managed by a file showing attributes of the AV stream file and a file which designates the reproducing interval and the like by the predetermined unit, so that an edition in which the reproducing interval and the reproducing order of the AV stream file have freely been set can be easily executed without modifying the AV stream file on the recording medium. In such a file management form, a recording format in which an editing process can be executed is demanded.

DISCLOSURE OF INVENTION

It is, therefore, an object of the invention to provide a recording apparatus, a recording method, a recording program, an image pickup apparatus, an image pickup method, and an image pickup program, in which an AV stream in which video data and audio data have been multiplexed can be recorded onto a recording medium so that a title management and an edition can be easily performed.

To solve the above problem, according to the first invention, there is provided a recording apparatus for multiplexing video data and audio data and recording the multiplexed data onto a recording medium, comprising: a data input unit to which the video data and the audio data are inputted; a recording instruction input unit to which instructions for a recording start and a recording stop of the video data and the audio data are inputted; a recording unit configured to multiplex the video data and the audio data and record a multiplexed stream as a stream file onto the recording medium; a management information forming unit configured to, for the stream file recorded onto the recording medium, form an attribute file in which at least reproducing time information and address information of the stream file are made to correspond and a reproduction list file in which one or more reproducing interval data which designates a reproducing interval by setting a reproduction start point and a reproduction end point for the stream file is stored and in which mark information showing the reproducing time information for the stream file can be stored; and a control unit configured to control the recording unit and the management information forming unit, wherein the control unit controls the recording unit so as to record the video data and the audio data corresponding to an interval between the recording start and the recording stop based on the instructions of the recording instruction input unit as one stream file onto the recording medium and controls the management information forming unit so as to form the reproducing interval data which designates the one whole stream file as a reproducing interval and store the mark information showing time information corresponding to reproduction start time which is designated by the reproducing interval data into the reproduction list file.

According to the second invention, there is provided a recording method of multiplexing video data and audio data and recording the multiplexed data onto a recording medium, comprising: a recording instruction input step to which instructions for a recording start and a recording stop of the video data and the audio data inputted to a data input unit are inputted; a recording step of multiplexing the video data and the audio data and recording a multiplexed stream as a stream file onto the recording medium; a management information forming step of, for the stream file recorded onto the recording medium, forming an attribute file in which at least reproducing time information and address information of the stream file are made to correspond and a reproduction list file in which one or more reproducing interval data which designates a reproducing interval by setting a reproduction start point and a reproduction end point for the stream file is stored and in which mark information showing the reproducing time information for the stream file can be stored; and a control step of controlling the recording step and the management information forming step, wherein in the control step, the recording step is controlled so as to record the video data and the audio data corresponding to an interval between the recording start and the recording stop based on the instructions in the recording instruction input step as one stream file onto the recording medium and the management information forming step is controlled so as to form the reproducing interval data which designates the one whole stream file as a reproducing interval and store the mark information showing time information corresponding to reproduction start time which is designated by the reproducing interval data into the reproduction list file.

According to the third invention, there is provided a recording program for allowing a computer apparatus to execute a recording method of multiplexing video data and audio data and recording the multiplexed data onto a recording medium, wherein the recording method comprises: a recording instruction input step to which instructions for a recording start and a recording stop of the video data and the audio data inputted to a data input unit are inputted; a recording step of multiplexing the video data and the audio data and recording a multiplexed stream as a stream file onto the recording medium; a management information forming step of, for the stream file recorded onto the recording medium, forming an attribute file in which at least reproducing time information and address information of the stream file are made to correspond and a reproduction list file in which one or more reproducing interval data which designates a reproducing interval by setting a reproduction start point and a reproduction end point for the stream file is stored and in which mark information showing the reproducing time information for the stream file can be stored; and a control step of controlling the recording step and the management information forming step, in which in the control step, the recording step is controlled so as to record the video data and the audio data corresponding to an interval between the recording start and the recording stop based on the instructions in the recording instruction input step as one stream file onto the recording medium and the management information forming step is controlled so as to form the reproducing interval data which designates the one whole stream file as a reproducing interval and store the mark information showing time information corresponding to reproduction start time which is designated by the reproducing interval data into the reproduction list file.

According to the fourth invention, there is provided an image pickup apparatus for multiplexing video data obtained by photographing an object by an image pickup unit and audio data obtained by collecting an audio sound by a sound collecting unit and recording the multiplexed data onto a recording medium, comprising: the image pickup unit configured to photograph the object and output the video data; the sound collecting unit configured to collect the audio sound and output the audio data; a recording unit configured to multiplex the video data and the audio data and record a multiplexed stream as a stream file onto the recording medium; an operating unit configured to receive a user operation for instructing a start and a stop of the recording of the video data and the audio data to the recording medium; a management information forming unit configured to, for the stream file recorded onto the recording medium, form an attribute file in which at least reproducing time information and address information of the stream file are made to correspond and a reproduction list file in which one or more reproducing interval data which designates a reproducing interval by setting a reproduction start point and a reproduction end point for the stream file is stored and in which mark information showing the reproducing time information for the stream file can be stored; and a control unit configured to control an operation of the recording unit in accordance with the user operation to the operating unit and control the management information forming unit, wherein the control unit controls the recording unit so as to record the video data and the audio data corresponding to an interval between the recording start and the recording stop as one stream file onto the recording medium in accordance with the operation to the operating unit and controls the management information forming unit so as to form the reproducing interval data which designates the one whole stream file as a reproducing interval and store the mark information showing time information corresponding to reproduction start time which is designated by the reproducing interval data into the reproduction list file.

According to the fifth invention, there is provided an image pickup method for an image pickup apparatus for multiplexing video data obtained by photographing an object by an image pickup unit and audio data obtained by collecting an audio sound by a sound collecting unit and recording the multiplexed data onto a recording medium, comprising: a recording step of multiplexing the video data obtained by photographing the object by the image pickup unit and the audio data obtained by collecting the audio sound by the sound collecting unit and recording a multiplexed stream as a stream file onto the recording medium; a step of receiving a user operation to an operating unit for instructing a start and a stop of the recording of the video data and the audio data on to the recording medium; a management information forming step of, for the stream file recorded onto the recording medium, forming an attribute file in which at least reproducing time information and address information of the stream file are made to correspond and a reproduction list file in which one or more reproducing interval data which designates a reproducing interval by setting a reproduction start point and a reproduction end point for the stream file is stored and in which mark information showing the reproducing time information for the stream file can be stored; and a control step of controlling an operation in the recording step in accordance with the user operation to the operating unit and controlling the management information forming step, wherein in the control step, the recording step is controlled so as to record the video data and the audio data corresponding to an interval between the recording start and the recording stop as one stream file onto the recording medium in accordance with the operation to the operating unit and the management information forming step is controlled so as to form the reproducing interval data which designates the one whole stream file as a reproducing interval and store the mark information showing time information corresponding to reproduction start time which is designated by the reproducing interval data into the reproduction list file.

According to the sixth invention, there is provided an image pickup program for allowing a computer apparatus to execute an image pickup method for an image pickup apparatus for multiplexing video data obtained by photographing an object by an image pickup unit and audio data obtained by collecting an audio sound by a sound collecting unit and recording the multiplexed data onto a recording medium, wherein the image pickup method comprises: a recording step of multiplexing the video data obtained by photographing the object by the image pickup unit and the audio data obtained by collecting the audio sound by the sound collecting unit and recording a multiplexed stream as a stream file onto the recording medium; a step of receiving a user operation to an operating unit for instructing a start and a stop of the recording of the video data and the audio data to the recording medium; a management information forming step of, for the stream file recorded onto the recording medium, forming an attribute file in which at least reproducing time information and address information of the stream file are made to correspond and a reproduction list file in which one or more reproducing interval data which designates a reproducing interval by setting a reproduction start point and a reproduction end point for the stream file is stored and in which mark information showing the reproducing time information for the stream file can be stored; and a control step of controlling an operation in the recording step in accordance with the user operation to the operating unit and controlling the management information forming step, and in which in the control step, the recording step is controlled so as to record the video data and the audio data corresponding to an interval between the recording start and the recording stop as one stream file onto the recording medium in accordance with the operation to the operating unit and the management information forming step is controlled so as to form the reproducing interval data which designates the one whole stream file as a reproducing interval and store the mark information showing time information corresponding to reproduction start time which is designated by the reproducing interval data into the reproduction list file.

As mentioned above, according to the first, second, and third inventions, for the stream file obtained by multiplexing the video data and the audio data inputted to the data input unit and recording the multiplexed data onto the recording medium, the control is made so as to form the attribute file in which at least the reproducing time information and the address information of the stream file are made to correspond and the reproduction list file in which the one or more reproducing interval data which designates the reproducing interval by setting the reproduction start point and the reproduction end point for the stream file is stored and in which the mark information showing the reproducing time information for the stream file can be stored and record the video data and the audio data corresponding to the interval between the recording start and the recording stop based on the instructions by the recording instruction input as one stream file onto the recording medium, and the control is made so as to form the reproducing interval data which designates the one whole stream file as a reproducing interval and store the mark information showing the time information corresponding to the reproduction start time which is designated by the reproducing interval data into the reproduction list file. Therefore, the stream file can be recorded onto the recording medium by a management structure in which the stream file is managed by using a play list on a clip unit basis.

According to the fourth, fifth, and sixth inventions, for the stream file in which the video data obtained by photographing the object by the image pickup unit and the audio data obtained by collecting the audio sound by the sound collecting unit have been multiplexed and the multiplexed stream is recorded onto the recording medium, the control is made so as to form the attribute file in which at least the reproducing time information and the address information of the stream file are made to correspond and the reproduction list file in which the one or more reproducing interval data which designates the reproducing interval by setting the reproduction start point and the reproduction end point for the stream file is stored and in which the mark information showing the reproducing time information for the stream file can be stored and record the video data and the audio data corresponding to the interval between the recording start and the recording stop as one stream file onto the recording medium in accordance with the operation to the operating unit, and the control is made so as to form the reproducing interval data which designates the one whole stream file as a reproducing interval and store the mark information showing the time information corresponding to the reproduction start time which is designated by the reproducing interval data into the reproduction list file. Therefore, the video data and the audio data obtained by photographing the object can be recorded onto the recording medium by the management structure in which the video data and the audio data are managed by using the play list on a clip unit basis.

As mentioned above, according to the first, second, and third inventions, for the stream file obtained by multiplexing the video data and the audio data inputted to the data input unit and recording the multiplexed data onto the recording medium, the control is made so as to form the attribute file in which at least the reproducing time information and the address information of the stream file are made to correspond and the reproduction list file in which the one or more reproducing interval data which designates the reproducing interval by setting the reproduction start point and the reproduction end point for the stream file is stored and in which the mark information showing the reproducing time information for the stream file can be stored and record the video data and the audio data corresponding to the interval between the recording start and the recording stop based on the instructions by the recording instruction input as one stream file onto the recording medium, and the control is made so as to form the reproducing interval data which designates the one whole stream file as a reproducing interval and store the mark information showing time information corresponding to the reproduction start time which is designated by the reproducing interval data into the reproduction list file. Therefore, there is such an effect that the stream file can be recorded onto the recording medium by a management structure in which the stream file is managed by using a play list on a clip unit basis.

According to the fourth, fifth, and sixth inventions, for the stream file in which the video data obtained by photographing the object by the image pickup unit and the audio data obtained by collecting the audio sound by the sound collecting unit have been multiplexed and the multiplexed stream is recorded onto the recording medium, the control is made so as to form the attribute file in which at least the reproducing time information and the address information of the stream file are made to correspond and the reproduction list file in which the one or more reproducing interval data which designates the reproducing interval by setting the reproduction start point and the reproduction end point for the stream file is stored and in which the mark information showing the reproducing time information for the stream file can be stored and record the video data and the audio data corresponding to the interval between the recording start and the recording stop as one stream file onto the recording medium in accordance with the operation to the operating unit, and the control is made so as to form the reproducing interval data which designates the one whole stream file as a reproducing interval and store the mark information showing the time information corresponding to the reproduction start time which is designated by the reproducing interval data into the reproduction list file. Therefore, there is such an effect that the video data and the audio data obtained by photographing the object can be recorded onto the recording medium by the management structure in which the video data and the audio data are managed by using the play list on a clip unit basis.

BRIEF DESCRIPTION OF DRAWINGS

FIG. 6 is a schematic diagram showing a syntax indicating a structure of an example of a file "index.bdmv".

FIG. 7 is a schematic diagram showing a syntax indicating a structure of an example of a block blkIndexes( ).

FIG. 8 is a schematic diagram showing a syntax indicating a structure of an example of a file "MovieObject.bdmv".

FIG. 9 is a schematic diagram showing a syntax indicating a structure of an example of a block "blkMovieObjects( )".

FIG. 10 is a schematic diagram showing a syntax indicating a structure of an example of a play list file "xxxxx.mpls".

FIG. 11 is a schematic diagram showing a syntax indicating a structure of an example of a block blkPlayList( ).

FIG. 12 is a schematic diagram showing a syntax indicating a structure of an example of a block blkPlayItem( ).

FIGS. 13A and 13B are schematic diagrams for describing first and second seamless connection.

FIG. 14 is a schematic diagram showing a syntax indicating a structure of an example of a block blkPlayListMark( ).

FIG. 15 is a schematic diagram showing a syntax indicating a structure of an example of a clip information file.

FIG. 16 is a schematic diagram showing a syntax indicating a structure of an example of a block blkClipInfo( ).

FIG. 17 is a schematic diagram showing a syntax indicating a structure of an example of a block blkSequenceInfo( ).

FIG. 18 is a schematic diagram showing a syntax indicating a structure of an example of a block blkProgramInfo( ).

FIG. 19 is a schematic diagram showing a syntax indicating a structure of an example of a block blkCPI( ).

FIG. 20 is a schematic diagram showing a syntax indicating a structure of an example of a block blkEPMap( ).

FIG. 21 is a schematic diagram showing a syntax indicating a structure of an example of a block blkEPMapForOneStreamPID(EP_stream_type, Nc, Nf).

FIG. 22 is a schematic diagram showing a format of an example of an entry PTSEPCoarse and an entry PTSEPFine.

FIG. 23 is a schematic diagram showing a format of an example of an entry SPNEPCoarse and an entry SPNEPFine.

FIG. 24 is a schematic diagram showing a syntax indicating a structure of an example of a block blkExtensionData( ).

FIG. 28 is a schematic diagram showing a syntax indicating a structure of an example of a block DataBlock( ) in a field blkExtensionData( ) in a file "index.bdmv".

FIG. 29 is a schematic diagram showing a syntax indicating a structure of an example of a block blkTableOfPlayList( ).

FIG. 35 is a block diagram showing a construction of an example of a video camera apparatus according to another example of the embodiment of the invention.

BEST MODE FOR CARRYING OUT THE INVENTION

An embodiment of the invention will be described hereinbelow with reference to the drawings. First, for easy understanding, a format of an example which can be applied to the invention (hereinbelow, referred to as an AVCHD format) will be described. The AVCHD format has been proposed at present as such a recording format that an AV (Audio/Video) stream in which video data and audio data have been properly multiplexed is recorded onto a recordable recording medium. The AV stream recorded onto the recording medium can be managed on a clip unit basis by using a play list.

For example, a bit stream which has been encoded by a coding system specified in, for example, ITU-T (International Telecommunication Union-Telecommunication Standardization Sector) recommendation H.264 or ISO (International Organization for Standardization)/IEC (International Electrotechnical Commission) International Standard 14496-10 (MPEG-4 part 10) Advanced Video Coding (hereinbelow, abbreviated to H.264|AVC) or by a coding system such as MPEG (Moving Pictures Experts Group) video or MPEG Audio and has been multiplexed according to the MPEG2 systems is called a clip AV stream (or AV stream). The clip AV stream is recorded as a file onto a disc by a predetermined file system. Such a file is called a clip AV stream file (or AV stream file).

The clip AV stream file is a management unit on the file system and is not necessarily a management unit which can be easily understood by the user. When considering use convenience of the user, it is necessary that such a mechanism that video content divided into a plurality of clip AV stream files is collected into one content and reproduced, such a mechanism that only a part of the clip AV stream files is reproduced, further, information for enabling a special reproduction or a head search reproduction to be smoothly executed, and the like are recorded as a database onto the disc.

Figure 1:
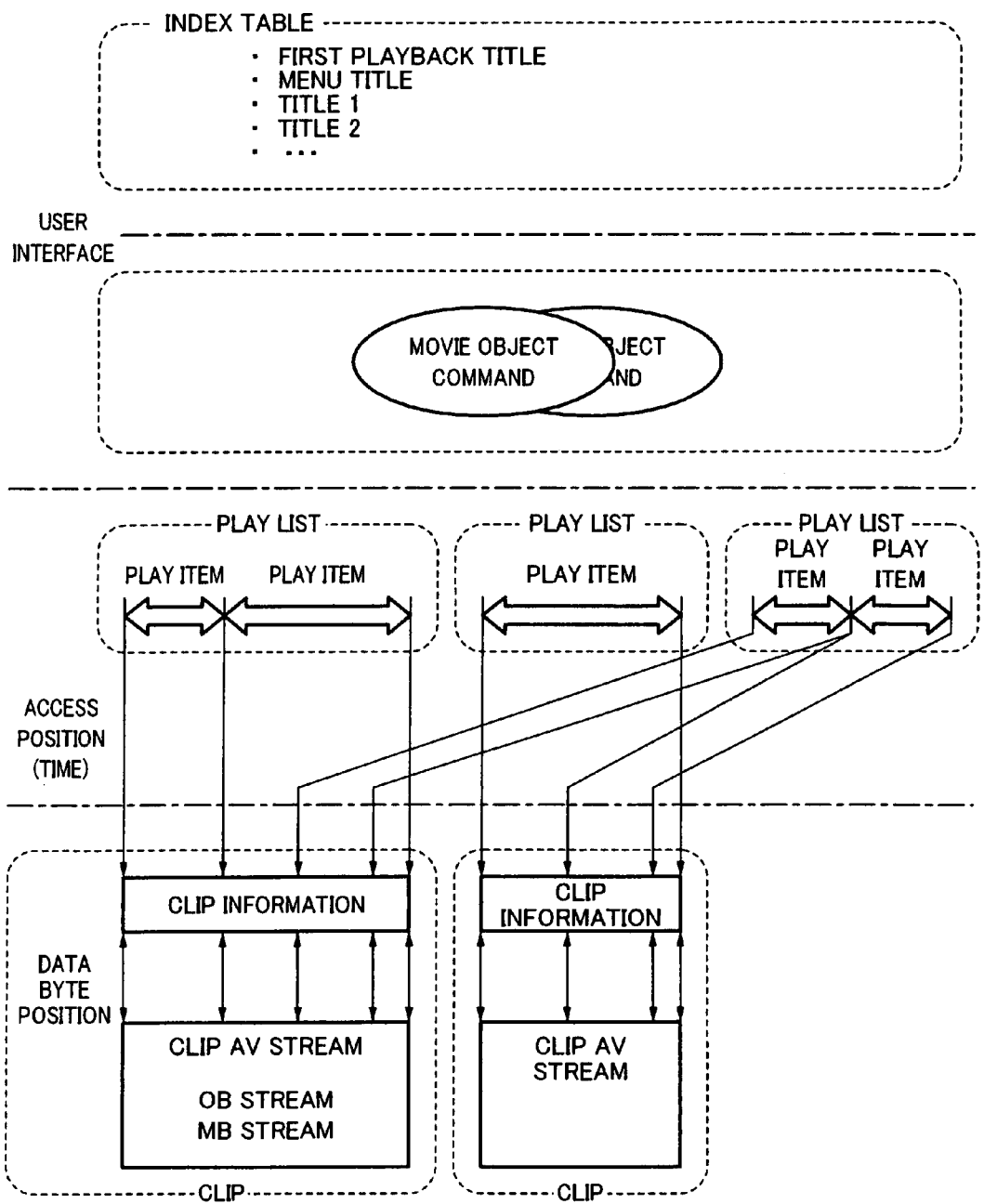
FIG. 1 is a schematic diagram schematically showing a data model which is specified in an AVCHD format which can be applied to the invention.

FIG. 1 schematically shows a data model which is specified in the AVCHD format which can be applied to the invention. According to the AVCHD format, a data structure is constructed by four layers as shown in FIG. 1. The bottom layer is a layer in which the clip AV stream is arranged (for convenience of explanation, called a clip layer). The layer on the clip layer is a layer in which a play list (PlayList) for designating a reproducing position for the clip AV stream and a play item (PlayItem) are arranged (for convenience of explanation, called a play list layer). The layer on the play list layer is a layer in which a movie object (Movie Object) and the like constructed by commands for designating reproducing order for the play list are arranged (for convenience of explanation, called an object layer). The top layer is a layer in which an index table for managing titles and the like which are stored in the recording medium is arranged (for convenience of explanation, called an index layer).

The clip layer will be described. The clip AV stream is a bit stream in which the video data and the audio data have been multiplexed into a format of MPEG2 TS (Transport Stream) or the like. Information regarding the clip AV stream is recorded as clip information (Clip Information) into the file.

An OB stream (Overlay Bitmap stream) as a graphics stream for displaying subtitles and an MB stream (Menu Bitmap stream) stream in which data (button image data and the like) which is used for menu indication and the like has been converted into a stream can be multiplexed in the clip AV stream.

The clip AV stream file and the clip information file in which the corresponding clip information has been recorded are regarded as a bundle of object and called a clip (Clip). That is, the clip is one object constructed by the clip AV stream and the clip information.

Generally, the file is handled as a byte train. The content of the clip AV stream file is developed on a time base. An entry point in the clip is designated mainly by the time base. When a time stamp of an access point to a predetermined clip is given, the clip information file can be used to find out address information in which the reading of the data should be started in the clip AV stream file.

The play list layer will be described. The play list is constructed by: designation of the AV stream file to be reproduced; and a set of a reproduction start point (IN point) and a reproduction end point (OUT point) for designating the reproducing position of the designated AV stream file. A set of information of the reproduction start point and the reproduction end point is called a play item (PlayItem). The play list is constructed by a set of play items. The operation to reproduce the play item denotes the operation to reproduce a part of the AV stream file which is referred to by the play item. That is, a corresponding interval in the clip is reproduced on the basis of the information of the IN point and the OUT point in the play item.

The object layer will be described. The movie object includes terminal information for associating a navigation command program with the movie object. The navigation program is a command (navigation command) for controlling the reproduction of the play list. The terminal information includes information for permitting the interactive operation to the player of the user. The user operation such as calling of a menu display screen or title search is controlled on the basis of the terminal information.

The index layer will be described. The index layer is constructed by an index table (Index Table). The index table is a top-level table which defines the title of content recorded in the recording medium. The reproduction of the recording medium is controlled by a module manager in system software which is permanently stationed at the player on the basis of the title information stored in the index table.

Figure 2:
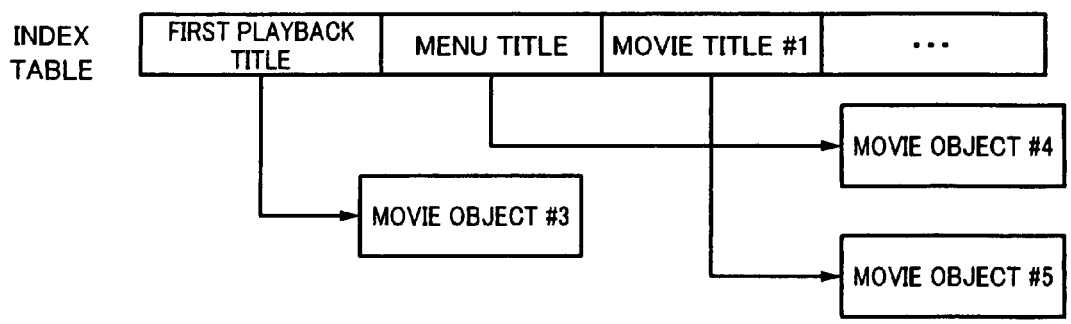
FIG. 2 is a schematic diagram for describing an index table.

That is, as schematically shown in FIG. 2, an arbitrary entry in the index table is called a title. All of a first playback title (First PlaybackTitle), a menu title (MenuTitle), and movie titles (MovieTitle) #1, #2, . . . which are entered into the index table are titles. Each title shows a link to the movie object.

For easy understanding, a read-only recording medium will now be considered as an example. For instance, if the content stored in the recording medium is a movie, the first playback title corresponds to a video image for advertisement (trailer) of a movie company which is displayed prior to the main part of the movie. For instance, if the content is a movie, the menu title corresponds to a menu display screen for selecting a reproduction of the main part, a chapter search, setting of subtitles and language, a reproduction of a premium video image, or the like. The movie title is each video image which is selected from the menu title. Such a construction that the title is further the menu display screen can be also used.

Figure 3:
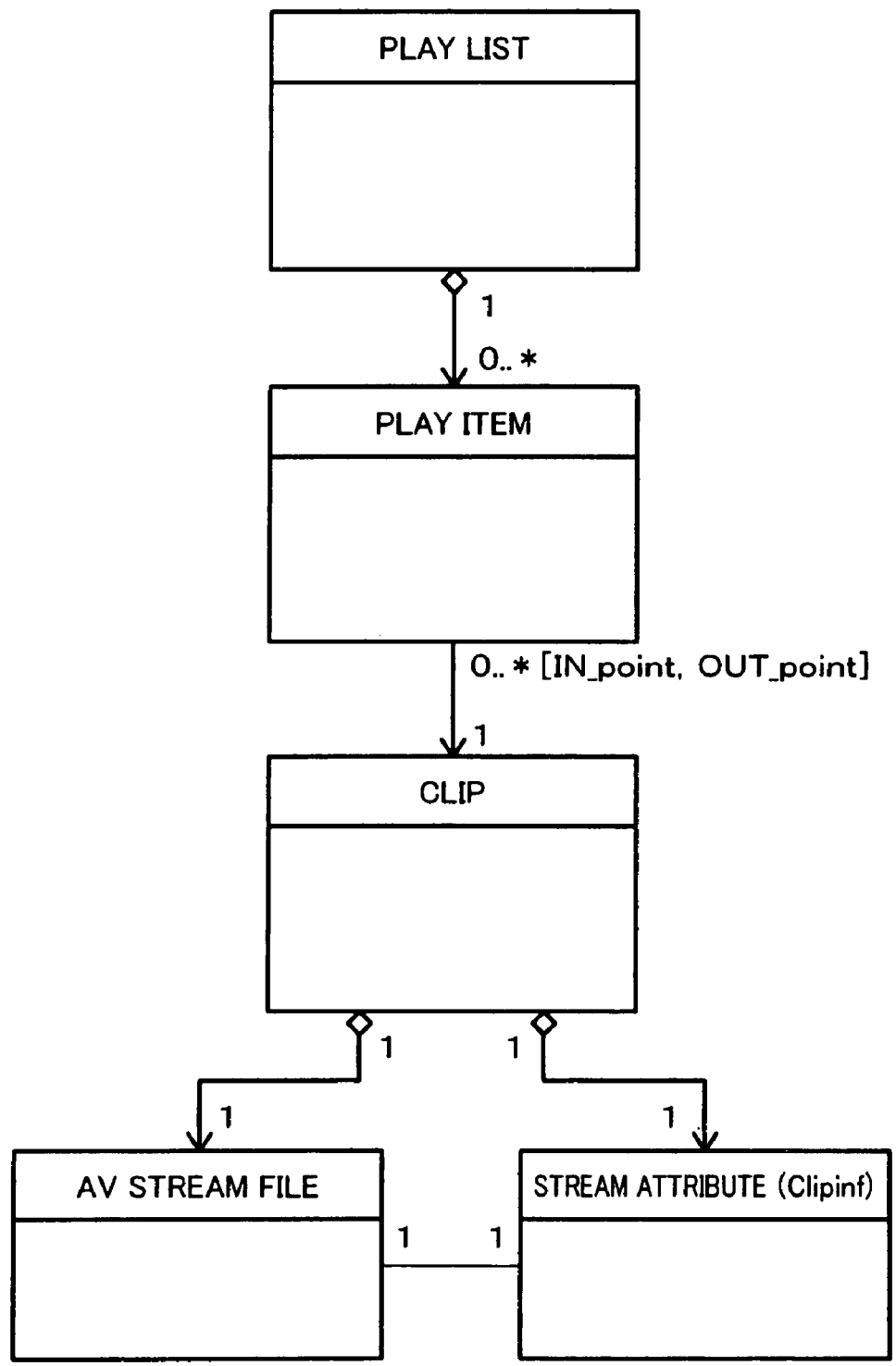
FIG. 3 is a UML diagram showing a relation among a clip AV stream, clip information, a clip, a play item, and a play list.

FIG. 3 is a UML (Unified Modeling Language) diagram showing a relation among the clip AV stream, clip information (Stream Attributes), clip, play item, and play list. The play list is made to correspond to one or a plurality of play items. The play item is made to correspond to one clip. A plurality of play items in which the start points and/or the end points differ can be made to correspond to one clip. One clip AV stream file is referred to from one clip. Similarly, one clip information file is referred to from one clip. The clip AV stream file and the clip information file have a one-to-one corresponding relational manner. By defining such a structure, a nondestructive reproducing order designation in which only an arbitrary portion is reproduced without changing the clip AV stream file can be performed.

Figure 4:
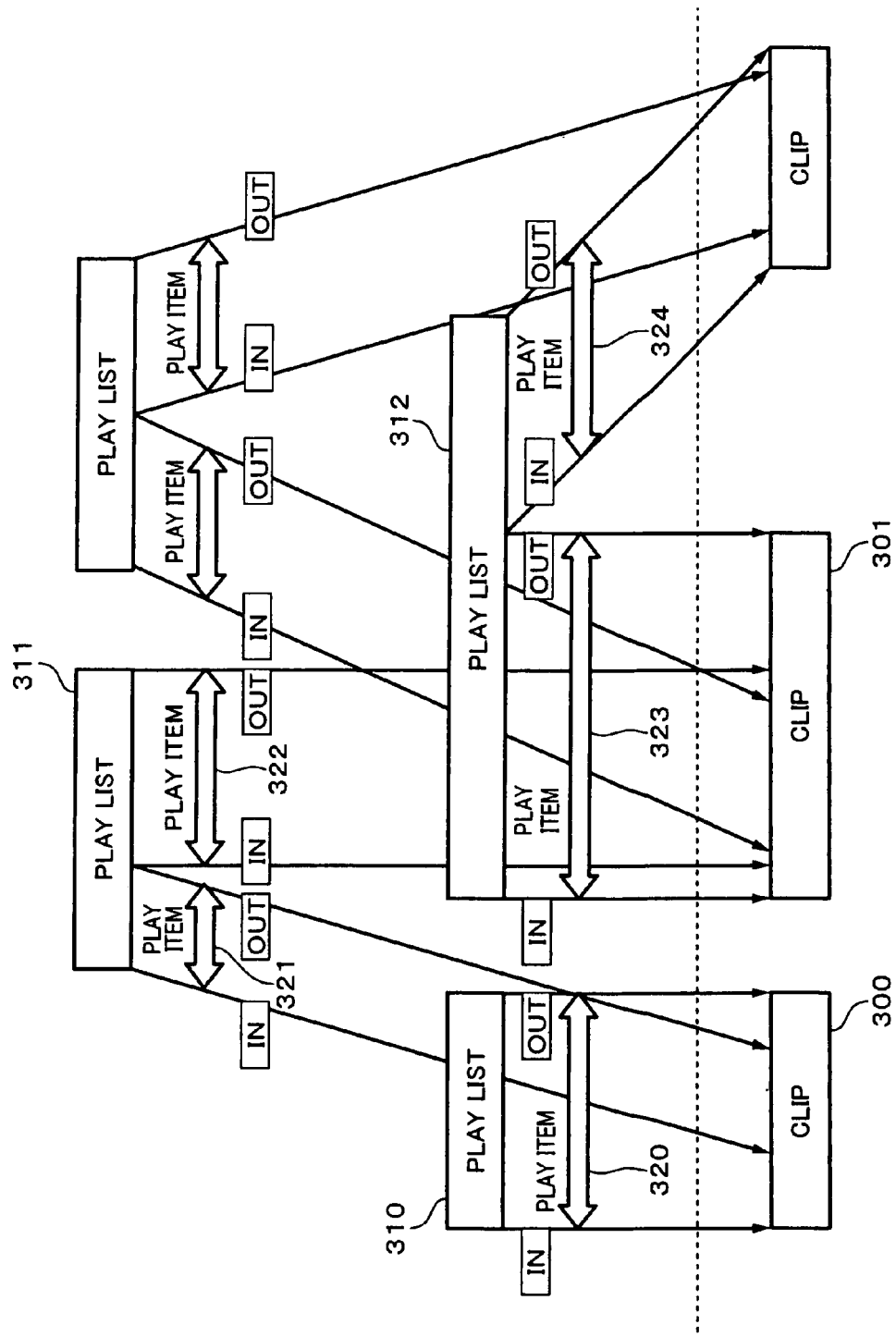
FIG. 4 is a schematic diagram for describing a method of referring to the same clip from a plurality of play lists.

As shown in FIG. 4, the same clip can be also referred to from a plurality of play lists. A plurality of clips can be also designated form one play list. The clip is referred to on the basis of the IN point and the OUT point shown in the play item in the play list. In the example of FIG. 4, a clip 300 is referred to from a play item 320 in a play list 310 and an interval shown by the IN point and the OUT point is referred to from a play item 321 between play items 321 and 322 constructing a play list 311 is also referred to. As for a clip 301, an interval shown by the IN point and the OUT point is referred to from the play item 322 in the play list 311 and an interval shown by the IN point and the OUT point of a play item 323 between play items 323 and 324 in a play list 312 is also referred to.

Figure 5:
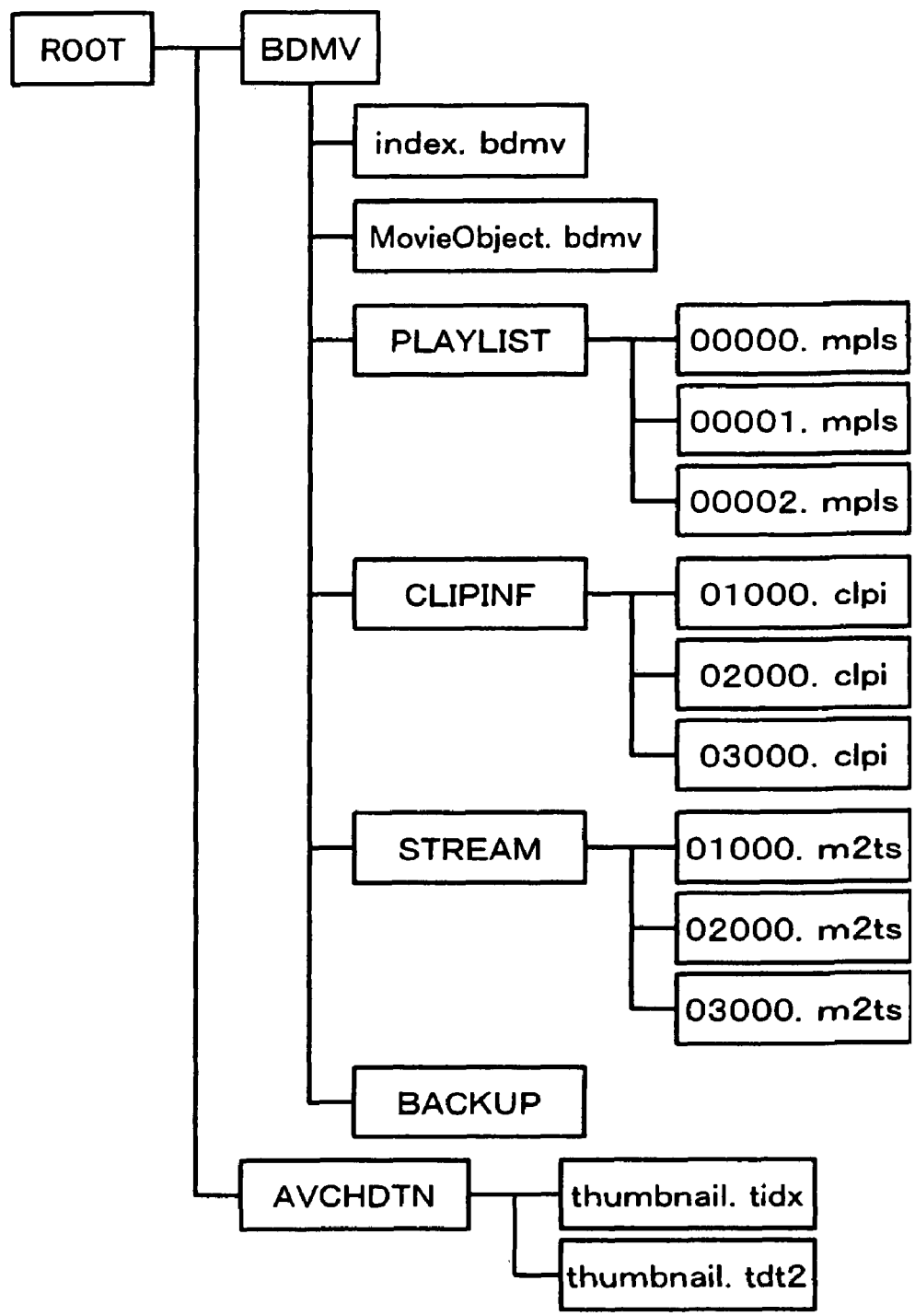
FIG. 5 is a schematic diagram for describing a management structure of a file which is recorded onto a recording medium.

Subsequently, a management structure of the file which is recorded in the recording medium according to the AVCHD format will now be described with reference to FIG. 5. The file is managed by a directory structure in a layer manner. First, one directory (in an example of FIG. 5, root directory) is formed onto the recording medium. It is assumed that an area under this directory is a range which is managed by one recording and reproducing system.

A directory "BDMV" and a directory "AVCHDTN" are arranged under the root directory. For example, a thumbnail file in which a representative image of the clip has been reduced into a predetermined size is arranged in the directory "AVCHDTN". The data structure described with reference to FIG. 1 is stored into the directory "BDMV".

Only two files such as file "index.bdmv" and file "MovieObject.bdmv" can be arranged just under the directory "BDMV". A directory "PLAYLIST", a directory "CLIPINF", a directory "STREAM", and a directory "BACKUP" are arranged under the directory "BDMV". A backup of each directory and the file is stored in the directory "BACKUP".

The file "index.bdmv" describes the contents of the directory "BDMV". That is, the file "index.bdmv" corresponds to the index table in the index layer as a top layer mentioned above. Information of one or more movie objects is stored into the file "MovieObject.bdmv". That is, the file "MovieObject.bdmv" corresponds to the object layer mentioned above.

The directory "PLAYLIST" is a directory in which the database of the play list is arranged. That is, the directory "PLAYLIST" includes a file "xxxxx.mpls" as a file regarding the play list. The file "xxxxx.mpls" is a file which is formed for each of the play lists. In the file name, "xxxxx" before "." (period) is a numeral of five digits. "mpls" after the period is an extension fixedly provided for such a type of file.

The directory "CLIPINF" is a directory in which a database of the clip is arranged. That is, the directory "CLIPINF" includes a file "zzzzz.clpi" as a clip information file for each of the clip AV stream files. In the filename, "zzzzz" before "." (period) is a numeral of five digits. "clpi" after the period is an extension fixedly provided for such a type of file.

The directory "STREAM" is a directory in which the AV stream file as a substance is arranged. That is, the directory "STREAM" includes the clip AV stream file corresponding to each of the clip information files. The clip AV stream file is constructed by a transport stream of MPEG2 (Moving Pictures Experts Group 2) (hereinbelow, abbreviated to MPEG2 TS) and the file name is set to "zzzzz.m2ts". In the file name, by setting "zzzzz" before the period so as to be identical to that of the corresponding clip information file, a correspondence relation between the clip information file and the clip AV stream file can be easily grasped.

Two kinds of thumbnail files "thumbnail.tidx" and "thumbnail.tdt2" can be arranged in the directory "AVCHDTN". A thumbnail image which has been encrypted by a predetermined system is stored in the thumbnail file "thumbnail.tidx". A thumbnail image which is not encrypted is stored in the thumbnail file "thumbnail.tdt2". For example, since it is considered that a thumbnail image corresponding to the clip photographed by the user by using a video camera is a copyfree image and does not need to be encrypted, it is stored into the thumbnail file "thumbnail.tdt2".

The files which are strongly concerned with the invention among the files shown in FIG. 5 will be described in more detail. First, the file "index.bdmv" arranged just under the directory "BDMV" will be described. FIG. 6 shows a syntax indicating a structure of an example of the file "index.bdmv". The syntax is shown here on the basis of a descriptive grammar of the C language which is used as a descriptive language of the program in a computer apparatus or the like. This is true of a diagram showing another syntax.

In FIG. 6, a field TypeIndicator has a data length of 32 bits and shows that this file is the index table. A field TypeIndicator2 has a data length of 32 bits and shows a version of this file "index.bdmv". A field IndexesStartAddress has a data length of 32 bits and shows a start address of a block blkIndexes( ) existing in this syntax.

A field ExtensionDataStartAddress has a data length of 32 bits and shows a start address of a block blkExtensionData( ) existing in this syntax. The block blkExtensionData( ) is a block for enabling predetermined extension data to be stored. In the field ExtensionDataStartAddress, the start address of the block blkExtensionData( ) is shown by the relative number of bytes from the first byte of this file "index.bdmv". The relative number of bytes starts from "0". If a value of the field ExtensionDataStartAddress is equal to "0", this means that the block blkExtensionData( ) does not exist in this file "index.bdmv".

An area "reserved" having a data length of 192 bytes is arranged subsequent to the field ExtensionDataStartAddress. The area "reserved" is an area for a byte alignment, a future addition of a field, or the like. This is true of the following description. A block blkAppInfoBDMV( ) is a block in which the content producer can describe arbitrary information and this block does not exercise an influence on the operation of the player or the like.

The block blkIndexes( ) is the substantial contents of this file "index.bdmv". The first playback which is reproduced when the disc is loaded into the player or the title (movie object) which is called from the top menu is designated on the basis of the contents described in the block blkIndexes( ). A play list file, which will be described hereinafter, is read on the basis of a command described in the movie object or the like called by the index table.

FIG. 7 shows a syntax indicating a structure of an example of the block blkIndexes( ). A field Length has a data length of 32 bits and shows the data length in a range from a position just after the field Length to the end of the block blkIndexes( ). Subsequently, a block FirstPlaybackTitle( ) and a block MenuTitle( ) are arranged.

Information regarding the object which is used in the first playback is described in the block FirstPlaybackTitle( ). In the block FirstPlaybackTitle( ), subsequent to an area "reserved" having a data length of 1 bit, a fixed value "1" is described. Further, the fixed value "1" is described through an area "reserved" having a data length of 31 bits. A field FirstPlaybackTitleMobjIDRef having a data length of 16 bits is arranged through an area "reserved" having a data length of 14 bits. An ID of the movie object which is used in the first playback title is shown by this field FirstPlaybackTitleMobjIDRef.

The ID of the movie object is shown by, for example, a value mobj_id which is used as a loop variable in a "for loop sentence" of the movie object on the basis of syntaxes of the movie object, which will be described with reference to FIGS. 8 and 9. In this example, the value mobj_id corresponding to the movie object which is referred to is stored in the field FirstPlaybackTitleMobjIDRef.

The field FirstPlaybackTitleMobjIDRef in the block FirstPlaybackTitle( ) in the block blkIndexes( ) may indicate the movie object in the top menu or may indicate the title.

Information regarding the object which is used in the top menu is described in a block MenuTitle( ). In the block MenuTitle( ), subsequent to an area "reserved" having a data length of 1 bit, the fixed value "1" is described. Further, the fixed value "1" is described through an area "reserved" having a data length of 31 bits. A field MenuTitleMobjIDRef having a data length of 16 bits is arranged through an area "reserved" having a data length of 14 bits. The field MenuTitleMobjIDRef indicates an ID of the movie object which is used in the menu title.

A field NumberOfTitles next to the block MenuTitle( ) has a data length of 16 bits and indicates the number of titles which can be selected and reproduced by the user. In accordance with the next "for loop sentence", a block MovieTitle[title_id]( ) is described the number of times shown in the field NumberOfTitles by using a value title_id as an argument. Information of each title is described in the block MovieTitle[title_id]( ). The value title_id is a numerical value within a range from "0" to a value shown by the field NumberOfTitles and is used to identify the title.

The fixed value "1" is described in the block MovieTitle[title_id]( ) through an area "reserved" having a data length of 1 bit. Further, a fieldMovieTitleMobjIDRef is described through an area "reserved" having a data length of 46 bits. The field MovieTitleMobjIDRef has a data length of 16 bits and indicates an ID of the movie object which is used in this title. An area "reserved" having a data length of 32 bits is arranged after the field MovieTitleMobjIDRef.

FIG. 8 shows the syntax indicating a structure of an example of the file "MovieObject.bdmv" which is arranged just under the directory "BDMV". A field TypeIndicator has a data length of 32 bits (4 bytes) and indicates that this file is the file "MovieObject.bdmv". A character string constructed by four characters encoded by the coding system specified in the ISO (International Organization for Standardization) 646 is described in the fieldTypeIndicator. In the example of FIG. 8, the character string "MOBJ" of four characters encoded by the coding system specified in the ISO646 is described in the field type_indicator and indicates that this file is a file "MovieObject.bdmv".

A field TypeIndicator2 has a data length of 32 bits (4 bytes) and indicates a version number of the file "MovieObject.bdmv". In the file "MovieObject.bdmv", the character string constructed by four characters encoded by the coding system specified in ISO 646 has to be "0100".

A field ExtensionDataStartAddress has a data length of 32 bits and indicates a start address of a block blkExtensionData( ) existing in this syntax. In the field ExtensionDataStartAddress, the start address of the block blkExtensionData( ) is shown by the relative number of bytes from the first byte of the file "MovieObject.bdmv". The relative number of bytes starts from "0". If a value of the field ExtensionDataStartAddress is equal to "0", this means that the block blkExtensionData( ) does not exist in the file "MovieObject.bdmv".

A field padding_word in the syntax shown in FIG. 8 has a data length of 16 bits. The field padding_word is inserted into the "for loop sentence" the number of times shown by a value N1 or N2 in accordance with the syntax of the file "MovieObject.bdmv". The value N1 or N2 is equal to 0 or an arbitrary positive integer. An arbitrary value can be used in the field padding_word.

Subsequent to the field ExtensionDataStartAddress, an area "reserved" having a data length of 224 bits is arranged. Subsequently, a block blkMovieObjects( ) as a main body of the file "MovieObject.bdmv" is stored.

FIG. 9 shows the syntax indicating a structure of an example of the block "blkMovieObjects( )". A field Length has a data length of 32 bits and indicates a data length in a range from a position just after the field Length to the end of the block "blkMovieObjects( )". A field NumberOfMobjs is arranged through an area "reserved" having a data length of 32 bits. The field NumberOfMobjs indicates the number of movie objects which are stored in accordance with the "for loop sentence" just after the field NumberOfMobjs. The movie object is unconditionally specified by the value mobj_id which is used as a loop variable of the "for loop sentence". The value mobj_id starts from "0". The movie object is defined by the order described in the "for loop sentence".

The fixed value "1" is described in a block TerminalInfo( ) in the "for loop sentence". Subsequently, an area, "reserved" having a data length of 15 bits is arranged. After that, a field NumberOfNavigationCommands[mobj_id] having a data length of 16 bits is arranged. The field NumberOfNavigationCommands[mobj_id] indicates the number of navigation commands (NavigationCommand) included in a movie object MovieObject[mobj_id] indicated by the value mobj_id.

The navigation commands of only the number shown in the field NumberOfNavigationCommands[mobj_id] are described by the "for loop sentence" in which a value command_id is used as a loop variable. That is, the navigation command NavigationCommand of the order shown by the value command_id included in the block MovieObject[mobj_id]( ) indicated by the value mobj_id is stored in a field NumberOfNavigationCommands[mobj_id] arranged in the "for loop sentence". The value command_id starts from 0. The navigation command NavigationCommand is defined by the order described in the "for loop sentence".

FIG. 10 shows a syntax indicating a structure of an example of a play list file "xxxxx.mpls". A field TypeIndicator has a data length of 32 bits (4 bytes) and indicates that this file is a play list file. A field TypeIndicator2 has a data length of 32 bits (4 bytes) and indicates a version of this play list file. A field PlayListStartAddress has a data length of 32 bits and indicates a start address of a block blkPlayList( ) in this syntax.

A field PlayListMarkStartAddress has a data length of 32 bits and indicates a start address of a block blkPlayListMark( ) in this syntax. A field ExtensionDataStartAddress has a data length of 32 bits and indicates a start address of a block blkExtensionData( ) in this syntax. The field ExtensionDataStartAddress indicates a value obtained by showing the start address of the block blkExtensionData( ) by the relative number of bytes from the first byte in the file "xxxxx.mpls". The relative number of bytes starts from "0". If the value of the field ExtensionDataStartAddress is equal to "0", this means that the block blkExtensionData( ) does not exist in the file "xxxxx.mpls".

A block blkAppInfoPlayList( ) is arranged through an area "reserved" having a data length of 160 bits. Information such as type of play list described in the next block blkPlayList( ), reproduction limitation, and the like is described in the block blkAppInfoPlayList( ). The play list is described in the block blkPlayList( ). A point to which a search position is jumped by a chapter jump or the like is described in the block blkPlayListMark( ). The block blkExtensionData( ) is a block for enabling predetermined extension data to be stored.

A field padding_word in the syntax shown in FIG. 10 has a data length of 16' bits. The field padding_word is inserted the number of times shown by a value N1, N2, or N3 in the "for loop sentence" in accordance with the syntax of the file "xxxxx.mpls". The value N1, N2, or N3 is equal to 0 or an arbitrary positive integer. An arbitrary value can be used in the field padding_word.

FIG. 11 shows a syntax indicating a structure of an example of the block blkPlayList( ). A field Length has a data length of 32 bits and indicates a data length in a range from a position just after the field Length to the end of the block blkPlayList( ). Subsequent to the field Length, an area "reserved" having a data length of 16 bits is arranged. A field NumberOfPlayItems is arranged after that. The field NumberOfPlayItems has a data length of 16 bits and indicates the number of play items included in the block blkPlayList( ). A field NumberOfSubPath indicates the number of sub-paths included in the block blkPlayList( ).

A block blkPlayItem( ) in which the play items are described is described the number of times shown in the field NumberOfPlayItems in accordance with the next "for loop sentence". A count number based on the "for loop sentence" is used as an identifier PlayItem_id of the block blkPlayItem( ). Further, a block blkSubPath( ) is described the number of times shown by the field NumberOfSubPath in accordance with the next "for loop sentence". A count number based on the "for loop sentence" is used as an identifier SubPath_id of the block blkSubPath( ).

The sub-path can be held in correspondence to the sub play item for a main path corresponding to the play item which is mainly reproduced. The sub-path is used, for example, in order to designate audio data for the after-recording or to designate a sub-video image which is reproduced synchronously with the clip that is designated by the play item when two video images are synthesized.

FIG. 12 shows a syntax indicating a structure of an example of a block blkPlayItem( ). A field Length has a data length of 16 bits and indicates a data length in a range from a position just after the field Length to the end of the block blkPlayItem( ).

A field ClipInformationFileName[0] has a data length of 40 bits (5 bytes) and a file name of a clip information file which is referred to by the block blkPlayItem( ) is shown. In this play item, the clip information file of the file name shown by the field ClipInformationFileName[0] is read out. A field ClipCodecIdentifier[0] has a data length of 32 bits (4 bytes) and indicates a codec system of the clip AV stream which is used in the play item according to the block blkPlayItem( ).

A field ConnectionCondition is arranged through an area "reserved" having a data length of 12 bits. The field ConnectionCondition has a data length of 4 bits and indicates information regarding a connecting state between the clips. For the recording medium only for use of recording, "1", "5", or "6" is used as a value of the field ConnectionCondition. When the value of the field ConnectionCondition is equal to "1", this means that the present clip and the next clip are not seamlessly connected. When the value of the field ConnectionCondition is equal to "5" or "6", this means that the present clip and the next clip are seamlessly connected. The seamless connection denotes that the reproduction control between the clip is made so that the present clip and the next clip are continuously reproduced at frame timing.

When the value of the field ConnectionCondition is equal to "5", in the clip which is referred to by the relevant play item, a recording length of the audio data is set to be longer than that of the video data (refer to FIG. 13A). Thus, when the clips are connected, a fade-out process of the audio data can be executed. For example, in the case where the clip is closed by the recording stopping operation by the user, the value of the field ConnectionCondition is set to "5". The connecting method of the clips in the case where the value of the field ConnectionCondition is equal to "5" is hereinbelow called a first seamless connection.

When the value of the field ConnectionCondition is equal to "6", in the clip which is referred to by the relevant play item, the recording length of the audio data is set to be equal to or shorter than that of the video data (refer to FIG. 13B). Thus, the clips can be seamlessly connected. For example, in the case where the clip is closed by the reason other than the recording stopping operation according to the user operation, for instance, by a system factor, the value of the field ConnectionCondition is set to "16". The connecting method of the clips in the case where the value of the field ConnectionCondition is equal to "6" is hereinbelow called a second seamless connection.

A field RefToSTCID[0] has a data length of 8 bits and indicates information regarding a discontinuous point of a system time base (STC). Each of a field INTime and a field OUTTime has a data length of 32 bits and indicates a reproducing range of a main clip AV stream. The field INTime indicates a start point (IN point) and the field OUTTime indicates an end point (OUT point).

A block blkUOMaskTable( ) is a table in which a reception limitation of the user input is set. A flag playItemRandomAccessFlag having a data length of 1 bit specifies whether or not a random access is permitted to the play item according to the block blkPlayItem( ). Subsequently, a field StillMode is arranged through an area "reserved" having a data length of 7 bits. The field StillMode has a data length of 8 bits and indicates whether or not the video image which has finally been displayed is displayed as a still image in the play item according to the block blkPlayItem( ). When a value of the field StillMode is equal to "0x01" (binary), a still time is shown by a field StillTime having a data length of 16 bits on the basis of an "if sentence". When the value of the field StillMode is equal to a value other than "0x01", the area having a data length of 16 bits is set to an area "reserved" which has been reserved for word alignment.

Attributes of the clip AV stream, a PID number, a recording position on the recording medium, and the like which are managed by the play item according to the block blkPlayItem( ) are managed in a block blkSTNTable( ).

FIG. 14 shows a syntax indicating a structure of an example of the block blkPlayListMark( ). A field Length has a data length of 32 bits and indicates a data length in a range from a position just after the field Length to the end of the block blkPlayListMark( ).

A field NumberOfPlayListMarks has a data length of 16 bits and indicates the number of play list marks included in the block blkPlayListMark( ). Information of the play list marks of only the number shown by the field NumberOfPlayListMarks is described in accordance with the next "for loop sentence".

Subsequent to an area "reserved" having a data length of 8 bits, a field MarkType is arranged in the "for loop sentence". The field MarkType has a data length of 8 bits and indicates a type of mark. A field RefToPlayItemID has a data length of 16 bits and identification information PlayItem_id for referring to the play item to which the mark is stamped is described. A field MarkTimeStamp has a data length of 32 bits and a time stamp showing a point where the mark is stamped is described. A field EntryESPID has a data length of 16 bits and shows a value of a PID of a TS packet including an elementary stream indicated by the mark. A field Duration is a unsigned integer having a data length of 32 bits according to a measurement using a clock of 45 kHz as a unit. When a value which is stored in the field Duration is equal to "0", the field Duration is meaningless.

FIG. 15 shows a syntax indicating a structure of an example of a clip information file. A field TypeIndicator has a data length of 32 bits (4 bytes) and shows that this file is a clip information file. A field TypeIndicator2 has a data length of 32 bits (4 bytes) and indicates aversion of this clip information file.

The clip information file has a block blkClipInfo( ), a block blkSequenceInfo( ), a block blkProgramInfo( ), a block blkCPI( ), a block blkClipMark( ), and a block blkExtensionData( ). Each of a field SequenceInfoStartAddress, a field ProgramInfoStartAddress, a field CPIStartAddress, a field ClipMarkStartAddress, and a field ExtensionDataStartAddress each having a data length of 32 bits indicates a start address of each of the corresponding blocks.

The field ExtensionDataStartAddress indicates the start address of the block blkExtensionData( ) by the relative number of bytes from the first byte in this clip information file. The relative number of bytes starts from "0". If a value of the field ExtensionDataStartAddress is equal to "0", this means that the block blkExtensionData( ) does not exist in the file "index.bdmv".

The block blkClipInfo( ) is started from the area next to an area "reserved" having a data length of 96 bits subsequent to those fields showing the start addresses. Information regarding the clip AV stream which is managed by this clip information file is described in the block blkClipInfo( ). Information for collectively managing sequences in which the STC or an ATC (arrival time base) continues is described in the block blkSequenceInfo( ). Information such as coding system of the clip AV stream, aspect ratio of the video data in the clip AV stream, and the like which are managed in this clip information file is described in the block blkProgramInfo( ). Information regarding characteristic point information CPI such as a random access start point or the like showing a characteristic position in the AV stream is stored in the block blkCPI( ).

An index point (jump point) such as a chapter position or the like to search for the head added to the clip is described in the block blkClipMark( ). The block blkExtensionData( ) is an area where the extension data can be stored. Since the relation of the block blkClipMark( ) and the block blkExtensionData( ) in the clip information file with the invention is weak, their detailed explanation is omitted here.

FIG. 16 shows a syntax indicating a structure of an example of a block blkClipInfo( ). A field Length has a data length of 32 bits and shows the data length in a range from a position just after the field Length to the end of the block blkClipInfo( ). A field ClipStreamType is arranged through an area "reserved" having a data length of 16 bits.

The field ClipStreamType has a data length of 8 bits and indicates a type of clip AV stream. A value of the field ClipStreamType is fixed to, for example, "1". A field ApplicationType has a data length of 8 bits and shows by which multiplication the clip AV stream (file having the extension of "m2ts") has been formed. When a value of the field ApplicationType is equal to "1", an ordinary motion image of the corresponding clip AV stream is reproduced. Subsequently, an area "reserved" having a data length of 31 bits is arranged.

A flag IsCC5 having a data length of 1 bit shows whether or not the connection between the corresponding clip and the next clip is made by the foregoing first seamless connection, that is, by the method in which the value of the field ConnectionCondition is equal to "5" according to the block blkPlayItem( ) in the play list. If a value of the flag IsCC5 is equal to "1" (binary value), this means that the connection between the clips has been made by the first seamless connection.

A field TSRecordingRate shows a recording rate of the clip AV stream file by bytes/sec. A field NumberOfSourcePackets shows the number of packets included in the clip AV stream. A block TSTypeInfoBlock( ) is arranged through an area "reserved" having a data length of 1024 bits reserved by the system. Information showing a type of packet in which the clip AV stream is stored is stored in the block TSTypeInfoBlock( ). Since a relation of the block TSTypeInfoBlock( ) with the invention is weak, its detailed explanation is omitted here.

Information after the following "if sentence" is described in the case where the value of the flag IsCC5 is equal to "1", that is, in the case where the connection between the corresponding clip and the next clip is made by the first seamless connection. A field FollowingClipStreamType is arranged through an area "reserved" having a data length of 8 bits after the "if sentence". The field FollowingClipStreamType has a data length of 8 bits and a type of clip next to the clip corresponding to the clip information file is described in this field. A field FollowingClipInformationFileName is arranged through an area "reserved" having a data length of 8 bits.

The field FollowingClipInformationFileName has a data length of 40 bits (5 bytes) and a file name of the clip information file corresponding to the clip next to the clip corresponding to the clip information file is described in this field. A next field ClipCodecIdentifier has a data length of 32 bits (4 bytes) and indicates a coding system of the next clip. In this example, the field ClipCodecIdentifier is fixed to a character string value "M2TS" of four characters encoded by the system specified in the ISO646. Subsequently, an area "reserved" having a data length of 8 bits is arranged.

FIG. 17 shows a syntax indicating a structure of an example of a block blkSequenceInfo( ). A field Length has a data length of 32 bits and shows the data length in a range from a position just after the field Length to the end of the block blkSequenceInfo( ). A fixed value "1" is described by the data length of 1 bit through an area "reserved" having a data length of 15 bits.

A next field SPNATCStart has a data length of 32 bits and the start of a sequence showing that data has been recorded for a continuous time (such a sequence is called a sequence ATCSequence) is shown by a packet number. In the example of FIG. 17, in the field SPNATCStart, its value is set to "0" and made coincident with the head of the clip AV stream file. A field NumberOfSTCSequence indicates the number of sequences STCSequence on the sequence ATCSequence. A value of the field NumberOfSTCSequence is set to "1" or more.

Information of the sequence STCSequence is described the number of times shown in the field NumberOfSTCSequence in accordance with the next "for loop sentence". The sequence STCSequence shows a range where a PCR (Program Clock Reference) serving as a reference of the time base in the MPEG2 TS (Transport Stream) is continuous. A number STC_id which is unconditional in the clip has been allocated to the sequence STCSequence. In the sequence STCSequence, since the consistent time base in which there are no discontinuous points can be defined, a start time and an end time of the play item can be unconditionally determined. That is, a start point and an endpoint of each play item have to exist in the same sequence STCSequence. In this for "loop sentence", the sequence STCSequence is designated by the value stc_id.

A field PCRPID[stc_id] has a data length of 16 bits and indicates a PID of a TS packet including the PCR (Program Clock Reference) in the MPEG2 TS. A field SPNSTCStart [stc_id] has a data length of 32 bits and indicates the start of the sequence STCSequence by the packet number. Each of a field PresentationStartTime and a field PresentationEndTime has a data length of 32 bits and indicates an effective range in the clip AV stream. The range shown by each of the field PresentationStartTime and the field PresentationEndTime becomes a range which can be referred to from the play item.

FIG. 18 shows a syntax indicating a structure of an example of a block blkProgramInfo( ). A field Length has a data length of 32 bits and shows the data length in a range from a position just after the field Length to the end of the block blkProgramInfo( ). The fixed value "1" by the data length of 1 bit is described through an area "reserved" having a data length of 15 bits.

A field SPNProgramSequenceStart has a data length of 32 bits. In the corresponding clip AV stream file, a number of a source packet whose program sequence is started is described. A field ProgramMapPID has a data length of 16 bits and indicates a value of the PID of the TS packet which is assumed to include a program map section which can be applied to the program sequence. A field NumberOfStreams InPS has a data length of 8 bits and indicates the number of elementary streams defined in the program sequence. An area "reserved" having a data length of 8 bits is arranged subsequent to the field NumberOfStreamsInPS.

In accordance with the next "for loop sentence", a value [stream_index] is set to a loop variable and sets of a field StreamPID[stream_index] and a block blkStreamCodingInfo (stream_index) of the number shown by the field NumberOfStreamsInPS are stored. The field StreamPID[stream_index] indicates a value of the PID corresponding to the elementary stream described in a PMT (Program Map Table) which has been referred to by the program sequence Information regarding a coding system of the elementary stream shown by the corresponding field StreamPID[stream_index] is described in a next block blkStreamCodingInfo(stream_index).

FIG. 19 shows a syntax indicating a structure of an example of a block blkCPI( ). In the encoded stream such as an MPEG stream to which an interframe compression has been performed, a position where the decoding can be started is often limited to a partial position such as a head of a GOP (Group Of Picture) or the like. The CPI (Characteristic Point Information) is a database in which information of the position of the start point where the decoding can be performed has been collected. The CPI is a table in which reproducing time and an address in the file are made to correspond. That is, the CPI is a table in which the information showing the head position of a decoding unit has been collected.

By deciding the database as mentioned above, for example, if the user wants to reproduce from arbitrary time, the address in the file of the reproducing position can be known by referring to the CPI on the basis of the reproducing time. Since this address is the head of the decoding unit, the player can read out and decode the data therefrom and promptly display an image.

The head position of the decoding unit (in this example, head position of the GOP) which is stored in the CPI is called an EP (Entry Point) entry.

In FIG. 19, a field Length has a data length of 32 bits and shows the data length in a range from a position just after the field Length to the end of the block blkCPI( ). In accordance with the next "if sentence", if the value of the field Length is not equal to 0, a field CPIType is arranged through an area "reserved" having a data length of 12 bits. The field CPIType has a data length of 4 bits and indicates a kind of CPI. A table in which a PTS value and a byte address in the corresponding clip AV stream file are made to correspond to each other is stored in a next block blkEPMap( ).

FIG. 20 shows a syntax indicating a structure of an example of the block blkEPMap( ). A field NumberOfStreamPIDEntries is arranged through an area "reserved" having a data length of 8 bits. The field NumberOfStreamPIDEntries has a data length of 8 bits and indicates the number of entries of a block blkEPMapForOneStreamPID in the block blkEPMap( ). In accordance with the "for loop sentence", a value [k] is set to a loop variable and information regarding the entry point of the number shown in the field NumberOfStreamPIDEntries is described.

In the "for loop sentence", a field StreamPID[k] has a data length of 16 bits and indicates a value of the PID of the transport packet for transmitting the elementary stream which is referred to by the block blkEPMapForOneStreamPID which is entered as a [k]th block in the block blkEPMap( ) (hereinbelow, such a block is referred to as a [k]th block blkEPMapForOneStreamPID).

A field EPStreamType[k] is arranged through an area "reserved" having a data length of 10 bits. The field EPStreamType[k] has a data length of 4 bits and indicates a type of elementary stream which is referred to by the [k]th block blkEPMapForOneStreamPID. A field NumberOfEPCoarseEntries[k] has a data length of 16 bits and indicates the number of entries in a sub-table for a coarse search (EP coarse table) in the [k]th block blkEPMapForOneStreamPID. A field NumberOfEPFineEntries[k] has a data length of 18 bits and indicates the number of entries in a sub-table for a fine search (EP fine table) in the [k]th block blkEPMapForOneStreamPID. A field EPMapForOneStreamPIDStartAddress[k] has a data length of 32 bits and indicates a relative byte position where the [k]th block blkEPMapForOneStreamPID in the block blkEPMap( ) starts. This value is shown by the number of bytes from the first byte of the block blkEPMap( ).

After the description by the "for loop sentence" mentioned above, in accordance with the "for loop sentence" which is described while sandwiching a padding word having a data length that is integer times as large as 16 bits, the value [k] is set to the loop variable, and blocks blkEPMapForOneStreamPID (EPStreamType[k], NumberOfEPCoarseEntries[k], NumberOfEPFineEntries[k]) of the number shown in the field NumberOfStreamPIDEntries are stored. That is, an argument NumberOfEPCoarseEntries[k] indicates the number of entries PTSEPCoarse and entries SPNEPCoarse which are stored in the sub-table (EP coarse table). Similarly, an argument NumberOfEPFineEntries[k] indicates the number of entries PTSEPFine and entries SPNEPFine which are stored in the sub-table (EP fine table). The argument NumberOfEPCoarseEntries[k] and the argument NumberOfEPFineEntries[k] are properly called the number Nc of entries and the number Nf of entries hereinbelow, respectively.

FIG. 21 shows a syntax indicating a structure of an example of a block blkEPMapForOneStreamPID(EP_stream_type, Nc, Nf). To describe a semantics of the block blkEPMapForOneStreamPID(EP_stream_type, Nc, Nf), first, meanings of an entry PTSEPStart and an entry SPNEPStart which are entries serving as foundations of the data that is stored in the block blkEPMapForOneStreamPID(EP_stream_type, Nc, Nf) will be explained.

Each of the entry PTSEPStart and the entry SPNEPStart associated with the entry PTSEPStart indicates an entry point on the AV stream. The entry PTSEPFine and the entry PTSEPCoarse associated with the entry PTSEPFine are derived from the same entry PTSEPStart. The entry SPNEPFine and the entry SPNEPCoarse associated with the entry SPNEPFine are derived from the same entry SPNEPStart.

FIG. 22 shows a format of an example of the entry PTSEPCoarse and the entry PTSEPFine. The PTS, that is, the entry PTSEPStart indicates a value in which a data length is equal to 33 bits. Assuming that the bit of the MSB is the 32nd bit and the bit of the LSB is the 0th bit, in the example of FIG. 22, as an entry PTSEPCoarse which is used when the search is performed on a coarse unit basis, 14 bits of the 32nd to 19th bits of the entry PTSEPStart are used. By the entry PTSEPCoarse, the search can be performed at a resolution of 5.8 seconds in a range up to 26.5 hours. As an entry PTSEPFine which is used to perform the more precise search, 11 bits of the 19th to 9th bits of the entry PTSEPStart are used. By the entry PTSEPFine, the search can be performed at a resolution of 5.7 milliseconds in a range up to 11.5 seconds. The 19th bit is used in common for the entry PTSEPCoarse and the entry PTSEPFine. Nine bits of the 0th bit to the 8th bit on the LSB side are not used.

FIG. 23 shows a format of an example of the entry SPNEPCoarse and the entry SPNEPFine. A source packet number, that is, the entry SPNEPStart indicates a value in which a data length is equal to 32 bits. Assuming that the bit of the MSB is the 31st bit and the bit of the LSB is the 0th bit, in the example of FIG. 23, as an entry SPNEPCoarse which is used when the search is performed on a coarse unit basis, all bits of the 31st to 0th bits of the entry SPNEPStart are used. As an entry SPNEPFine which is used to perform the more precise search, 17 bits of the 16th to 0th bits of the entry SPNEPStart are used. By the entry SPNEPFine, the search can be performed in a range up to the AV stream file of, for example, about 25 MB (Mega Byte).

In the case of the source packet number, only the value of a predetermined number of bits on the MSB side may be used as an entry SPNEPCoarse. For example, as an entry SPNEPCoarse, 17 bits of the 31st to 16th bits of the entry SPNEPStart are used. As an entry SPNEPFine, 17 bits of the 16th to 0th bits of the entry SPNEPStart are used.

The entry PTSEPStart and the entry SPNEPStart are defined as follows on the basis of the foregoing description.

As shown in FIG. 22, the entry PTSEPStart is a unsigned integer in which a data length is equal to 33 bits. In the AV stream, the entry PTSEPStart indicates a PTS of a 33-bit length of the video access unit which starts the video access from a picture (for example, an IDR (Instantaneous Decoding Refresh) picture or an I (Intra) picture)) which can be accessed at random is shown.

As shown in FIG. 23, the entry SPNEPStart is a unsigned integer of 32 bits and indicates an address in the AV stream of a source packet including the first byte of the video access unit associated with the entry PTSEPStart. The entry SPNEPStart is expressed by a unit of the source packet number. From the first source packet in the AV stream file, the value "0" is used as an initial value and the entry SPNEPStart is counted as a value which is increased one by one every source packet.

With reference to FIG. 21, as for the block blkEPMapForOneStreamPID(EP_stream_type, Nc, Nf), the sub-table (EP coarse table) to perform the search on a coarse unit basis is described by the first "for loop sentence" and the sub-table (EP fine table) to perform the search more finely on the basis of a search result of the sub-table (EP coarse table) is described by the second "for loop sentence".

A field EPFineTableStartAddress is arranged just before the first "for loop sentence". The field EPFineTableStartAddress has a data length of 32 bits and a start address of the first byte of a field ReservedEPFine[EP_fine_id] in the first (second "for loop") is shown by the relative number of bytes from the first byte of the block blkEPMapForOneStreamPID(EP_stream_type, Nc, Nf). The relative number of bytes starts from the value "0".

The first "for loop sentence" is repeated by a loop variable [i] until the number Nc of entries of the sub-table (EP coarse table) and a field RefToEPFineID[i], an entry PTSEPCoarse [i], and an entry PTSEPFine[i] of only the set number of the number Nc of entries are stored. In the first "for loop sentence", the field RefToEPFineID[i] has a data length of 18 bits and indicates an entry number in the sub-table (EP fine table) having the entry PTSEPFine associated with the entry PTSEPCoarse shown by a field PTSEPCoarse[i] subsequent to the field RefToEPFineID[i]. The entry PTSEPFine and the entry PTSEPCoarse associated with the entry PTSEPFine are derived from the same entry PTSEPStart. The field RefToEPFineID[i] is given by a value of a loop variable [EP_fine_id] which is defined by the order in which the loop variable is described in the second "for loop sentence".

After the first "for loop sentence", a description by the second "for loop sentence" is performed through the padding word. The second "for loop sentence" is repeated by the loop variable [EP_fine_id] until the number Nf of entries of the sub-table (EP fine table) and the field ReservedEPFine [EP_fine_id] having a data length of 1 bit, a field IEndPositionOffset[EP_fine_id] having a data length of 3 bits, a field PTSEPFine[EP_fine_id] having a data length of 11 bits, and a field SPNEPFine[EP_fine_id] having a data length of 17 bits of only the set number of the number Nf of entries are stored. Among them, the entry PTSEPFine and the entry SPNEPFine which are referred to from the sub-table (EP fine table) on the basis of the loop variable [EP_fine_id] are stored into the field PTSEPFine[EP_fine_id] and the field SPNEPFine[EP_fine_id], respectively.

The entry PTSEPCoarse, entry PTSEPFine, entry SPNEPCoarse, and entry SPNEPFine are derived as follows. It is assumed that Nf entries arranged in ascending order of values of the related data SPNEPStart exist in the sub-table (EP fine table). Each entry PTSEPFine is obtained from the corresponding entry PTSEPStart by the following equation (1).

$$PTSEPFine[EP\_fine\_id] = (PTSEPStart[EP\_fine\_id] >> 9)/2^{11} \quad (1)$$

A relation between the entry PTSEPCoarse and the corresponding entry PTSEPFine is derived as shown by the following equations (2) and (3).

$$PTSEPCoarse[i] = (PTSEPStart[RefToEPFineID[i]] >> 19)/2^{14} \quad (2)$$

$$PTSEPFine[RefToEPFineID[i]] = (PTSEPStart[RefToEPFineID[i]] >> 9)/2^{11} \quad (3)$$

Each entry SPNEPFine is obtained from the corresponding entry SPNEPStart by the following equation (4).

$$SPNEPFine[EP\_fine\_id] = SPNEPStart[EP\_fine\_id]/2^{17} \quad (4)$$

A relation between the entry SPNEPCoarse and the corresponding entry SPNEPFine is derived as shown by the following equations (5) and (6).

$$SPNEPCoarse[i] = SPNEPStart[RefToEPFineID[i]] \quad (5)$$

$$SPNEPFine[RefToEPFineID[i]] = SPNEPStart[RefToEPFineID[i]]/2^{17} \quad (6)$$

In the above equations (1) to (6), a symbol ">>x" denotes that the bits from a digit exceeding x bits from the LSB side of the data are used.

The block blkExtensionData( ) to store the extension data will now be described. This block blkExtensionData( ) is defined so that predetermined extension data can be stored. This block can be described in each of the file "index.bdmv" where the index table is stored, the file "xxxxx.mpls" where the play list is stored, and the clip information file "zzzzz.clpi".

FIG. 24 shows a syntax indicating a structure of an example of the block blkExtensionData( ). A field Length has a data length of 32 bits and the data length in a range from a position just after the field Length to the end of the block blkExtensionData( ) is shown by the number of bytes. If the data length of this field Length is not equal to "0", a description after the "if sentence" is made.

A field DataBlockStartAddress has a data length of 32 bits and a start address of a block DataBlock( ) in the syntax where a main body of the extension data is stored is shown by the relative number of bytes from the head byte of the block blkExtensionData( ). That is, the relative number of bytes starts from "0". The field DataBlockStartAddress has to satisfy the following condition of a 32-bit alignment.

DataBlockStartAddress %4=0

A field NumberOfExtDataEntries is arranged through an area "reserved" having a data length of 24 bits. The field NumberOfExtDataEntries has a data length of 8 bits and indicates the number of entries of the extension data which is stored in the block DataBlock( ) of the block blkExtensionData( ). Information to obtain the main body of the extension data is stored into an entry of the extension data. In this example, the entry of the extension data is a block ext_data_entry( ) constructed by a field ExtDataType, a field ExtDataVersion, a field ExtDataStartAddress, and a field ExtDataLength. In the block blkExtensionData( ), the blocks ext_data_entry( ) of only the number shown in the field NumberOfExtDataEntries exist in accordance with the first "for loop sentence".

The field ExtDataType has a data length of 16 bits and shows that the extension data described in the block blkExtensionData( ) is extension data for the recording apparatus. A value of this field ExtDataType is assumed to be a first value for identifying the extension data and it can be defined that the licensor (person who permits the use) of a standard document including the block blkExtensionData( ) allocates such a value. The field ExtDataVersion indicates a second value for identifying the extension data and it can be defined that it indicates a version number of this extension data. In this block blkExtensionData( ), two or more blocks ext_data_entry( ) in which the values of the field ExtDataType and the field ExtDataVersion are the same do not have to exist.

The field ExtDataStartAddress has a data length of 32 bits and indicates a start address of the extension data corresponding to the entry (block ext_data_entry( )) of the extension data including the field ExtDataStartAddress. In the field ExtDataStartAddress, the start address of the extension data ext_data is shown by the relative number of bytes from the head byte of the block blkExtensionData( ). The field ExtDataStartAddress has to satisfy the following condition of a 32-bit alignment.

ExtDataStartAddress %4=0

The field ExtDataLength has a data length of 32 bits and indicates a data length of the extension data corresponding to an entry (block ext_data_entries( )) of the extension data including this field ExtDataStartAddress. The data length is shown by the number of bytes.

When the entries (block ext_data_entry( )) of the extension data of only the number shown in the field NumberOfExtDataEntries are described, a set of two fields padding_word each of which has a data length of 16 bits and is constructed by an arbitrary data train is repeated the arbitrary number of times L1. After that, a block DataBlock( ) where the main body of the extension data is stored is described. One or more extension data are stored in the block DataBlock( ). Each extension data ext_data is extracted from the block DataBlock( ) on the basis of the field ExtDataStartAddress and the field ExtDataLength mentioned above.

Figure 25:
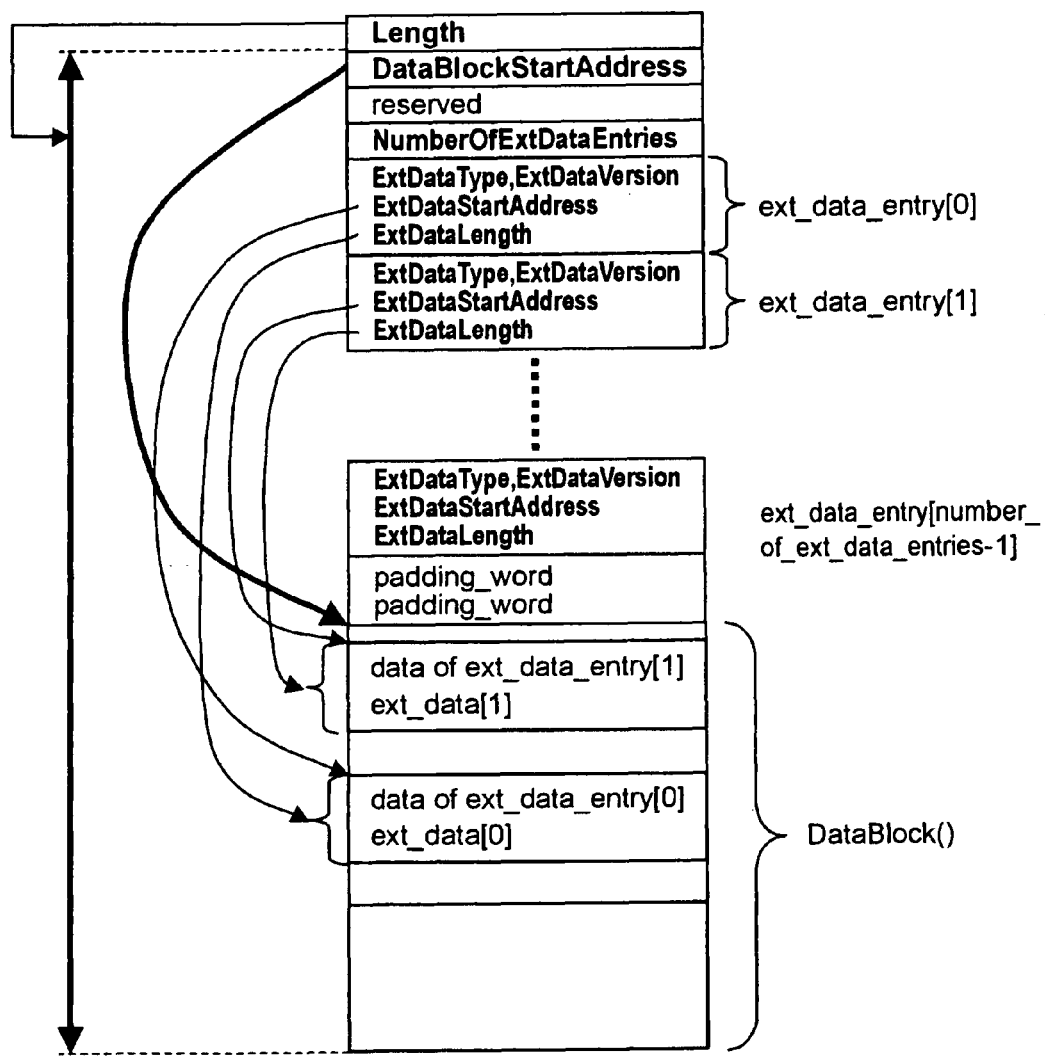
FIG. 25 is a schematic diagram schematically showing a reference relation among data in the block blkExtensionData( ).

FIG. 25 schematically shows a reference relation among data in the block blkExtensionData( ). The data length in the range from the position just after the field Length to the end of the block blkExtensionData( ) is shown by the field Length. The start position of the block DataBlock( ) is shown by a field DataBlockStartAddress. The blocks ext_data_entry of only the number shown in the field NumberOfExtDataEntries are described. The field padding_word of an arbitrary length is arranged between the last block ext_data_entry and the block DataBlock( ).

The extension data ext_data shown by the block ext_data_entry( ) is arranged in the block DataBlock( ). The position and the data length of each extension data ext_data are shown by the field ExtDataStartAddress and the field ExtDataLength in the corresponding block ext_data_entry( ). Therefore, the arranging order of the extension data ext_data in the block DataBlock( ) does not necessarily coincide with the arranging order of the corresponding block ext_data_entry( ).

As mentioned above, by forming the extension data so as to have a double-layer structure constructed by the block DataBlock( ) where the main body of the extension data is stored and the block ext_data_entry( ) where the access information of the access to the extension data in the block DataBlock( ) and the like are stored, a plurality of extension data can be stored.

Figure 26:
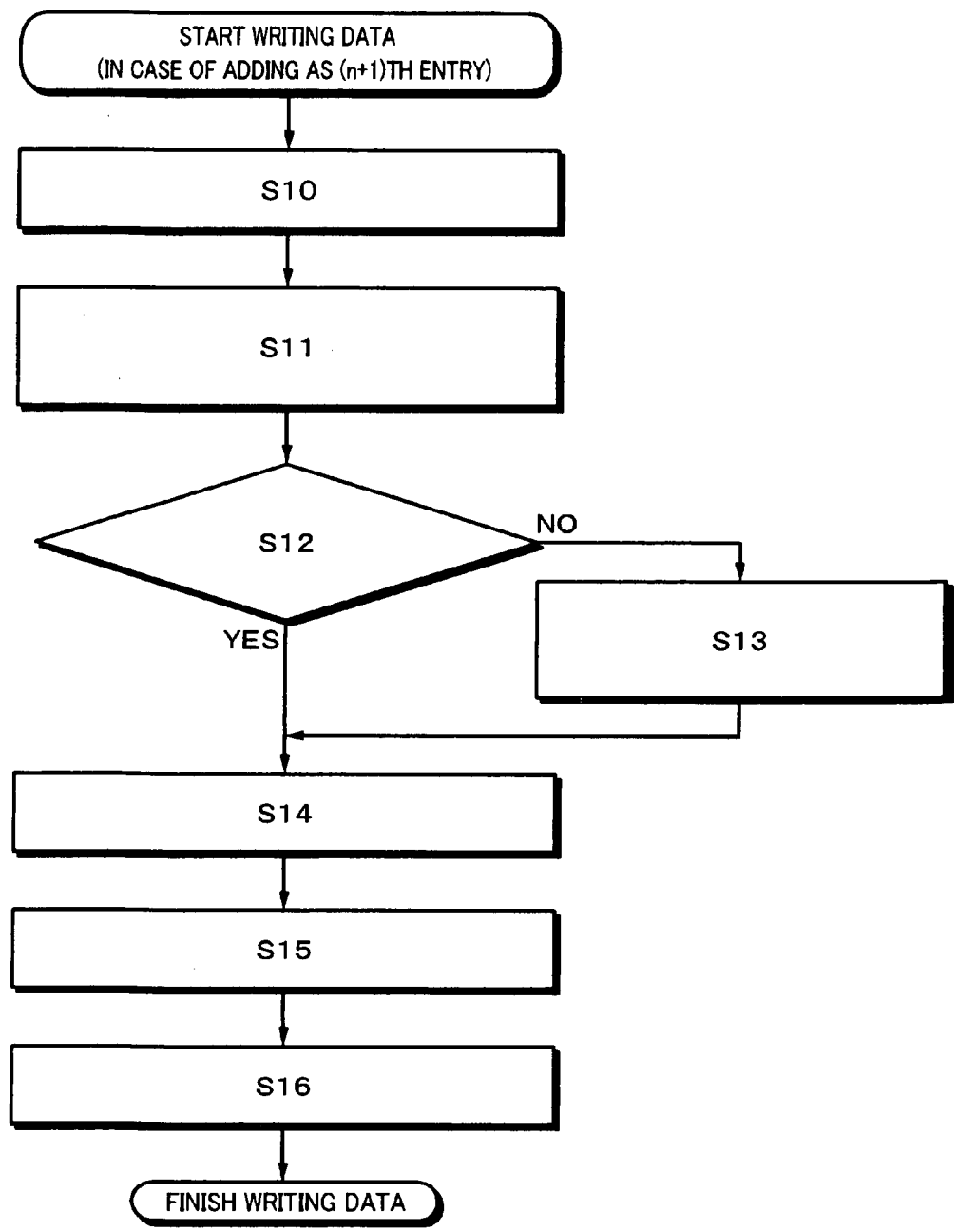
FIG. 26 is a flowchart showing processes of an example at the time of writing the data into the block blkExtensionData( ).

Subsequently, a forming method and a reading method of an example of the foregoing extension data will be described. FIG. 26 is a flowchart showing processes of an example at the time of writing the data into the block blkExtensionData( ). FIG. 26 shows an example in the case where the extension data is added as an (n+1)th entry in the block blkExtensionData( ), thereby rewriting the block blkExtensionData( ).

First, in step S10, the data length of the extension data to be written is obtained and set into a value of a field ExtDataLength[n+1]. The description of "[n+1]" corresponds to the number of the (n+1)th entry. Subsequently, in step S11, values of the field ExtDataLength and the field ExtDataStartAddress of each of the blocks ext_data_entry( ) listed in the current block blkExtensionData( ) are examined, thereby obtaining a using situation of the block DataBlock( ).

In next step S12, whether or not a continuous empty area which is equal to or larger than the data length shown in the field ExtDataLength[n+1] as a data length of the extension data to be written exists in the block DataBlock( ) is discriminated. If it is determined that the continuous empty area exists, the processing routine advances to step S14.

If it is determined that the continuous empty area of the data length shown in the field ExtDataLength[n+1] or more does not exist, the processing routine advances to step S13. The value of the field Length in the block blkExtensionData( ) is increased and the continuous empty area of the data length shown in the field ExtDataLength [n+1] or more is formed in the block DataBlock( ). After the empty area was formed, the processing routine advances to step S14.

In step S14, a head address of the area where the extension data is written is determined and a value of this head address is set to the field ExtDataStartAddress [n+1]. In next step S15, the extension data ext_data[n+1] of the length of the field ExtDataLength[n+1] set in step S10 mentioned above is written from the field ExtDataStartAddress[n+1].

After the writing of the data is finished, in step S16, the field ExtDataLength[n+1] and the field ExtDataStartAddress [n+1] are added to the block ext_data_entry( ).

In the above description, it is assumed that the block blkExtensionData( ) to be rewritten has already been read out of a recording medium such as a disk or the like and stored in a memory of the recording apparatus. Therefore, the enlargement of the block blkExtensionData( ) due to the change in the value of the field Length is entrusted to the system and the system properly performs the memory allocation, so that the block enlargement is executed.

Figure 27:
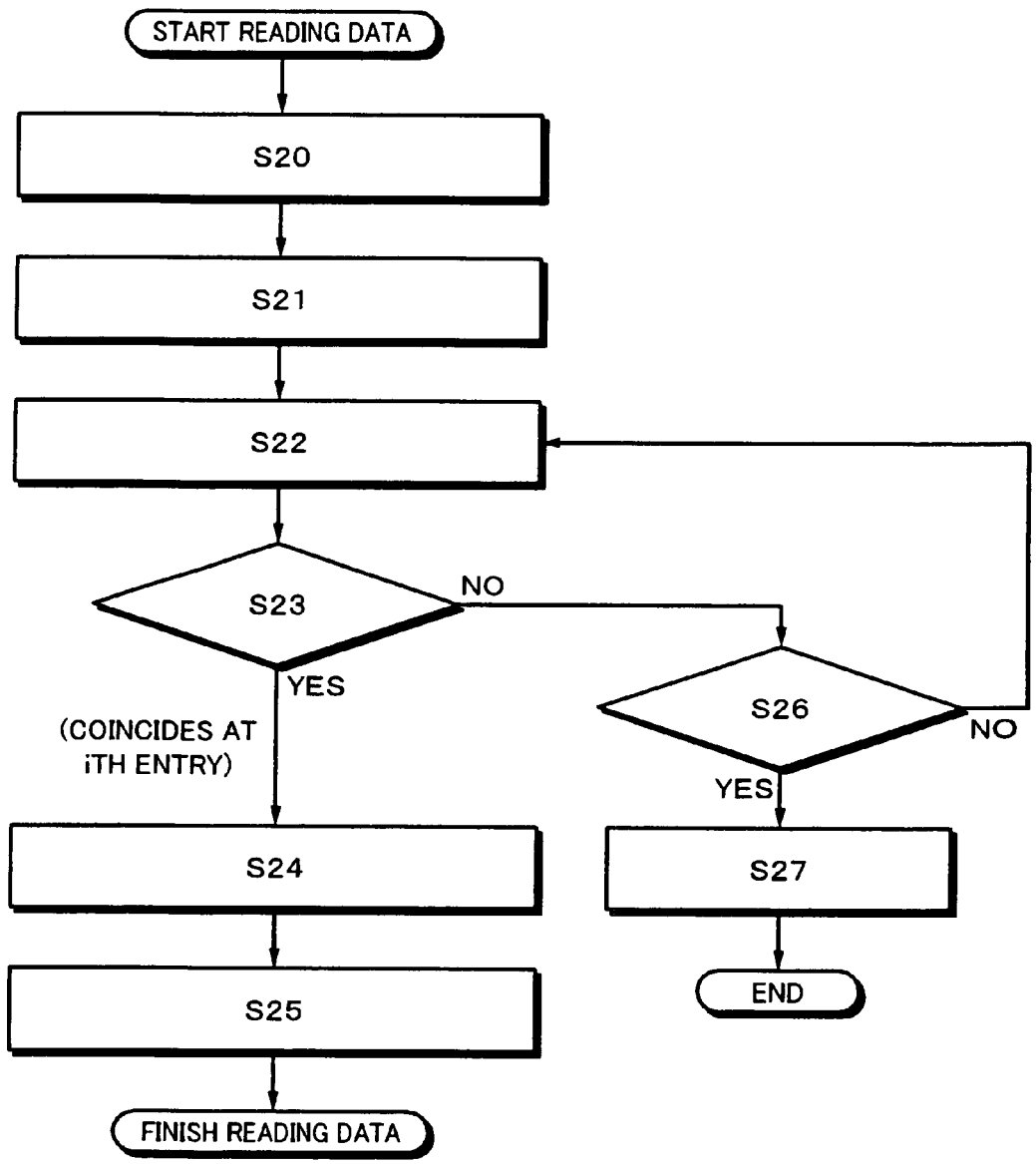
FIG. 27 is a flowchart showing processes of an example at the time of reading out extension data from the block blkExtensionData( ).

FIG. 27 is a flowchart showing processes of an example at the time of reading out the extension data from the block blkExtensionData( ). The processes according to the flowchart of FIG. 27 can be applied to both of the read only recording medium and the recordable recording medium.

First, in first step S20, the value of the field ExtDataType is obtained from the standard with which the extension data to be readout conforms. In step S21, the value of the field ExtDataVersion is obtained from the type of extension data to be read out.

In next step S22, the blocks ext_data_entry( ) listed in the block blkExtensionData( ) are sequentially read out one by one. In step S23, whether or not the values of the field ExtDataType and the field ExtDataVersion included in the read-out block ext_data_entry( ) coincide with the values of the field ExtDataType and the field ExtDataVersion obtained in steps S20 and S21 mentioned above is discriminated.

If it is determined that they do not coincide, the processing routine advances to step S26. Whether or not all of the blocks ext_data_entry( ) listed in the block blkExtensionData( ) have completely been read out is discriminated. If it is determined that they have completely been read out, the processing routine advances to step S27 and it is decided that the extension data to be read out does not exist in the block blkExtensionData( ). A series of processes is finished. If it is determined that the reading of all of the blocks is not finished yet, the processing routine is returned to step S22 and the next block ext_data_entry( ) is read out.

In step S23 mentioned above, if it is determined that the values of the field ExtDataType and the field ExtDataVersion included in the block ext_data_entry( ) coincide with the obtained values of the field ExtDataType and the field ExtDataVersion, the processing routine advances to step S24. It is assumed here that they coincide in the [i]th entry in the block blkExtensionData( ).

In step S24, the value of the field ExtDataLength[i] and the value of the field ExtDataStartAddress[i] are read out of the block ext_data_entry( ) of the [i]th entry. In step S25, the data of only an amount corresponding to the data length shown in the field ExtDataLength[i] is read out of the address shown in the field ExtDataStartAddress[i] which has been read out in step S24.

Subsequently, the extension data block blkExtensionData( ) in which the extension data has been stored and which can be defined in each of the foregoing index file "index.bdmv", movie object file "MovieObject.bdmv", play list file "xxxxx.mpls", and clip information file "zzzzz.clpi" will be described.

First, the extension data block of an example which is defined for the index file "index.bdmv" will be described. Explanation will be made here with respect to the extension data block of an example in which attribute information that is peculiar to the recordable recording medium is added every play list. FIG. 28 shows a syntax which is used to describe the play list attributes and indicates a structure of an example of the block DataBlock( ) (refer to FIG. 24) in the field blkExtensionData( ) in the file "index.bdmv". In the example of FIG. 28, the block DataBlock( ) has been described as a block blkIndexExtensionData( ).

First, with reference to FIG. 24 mentioned above, in the block blkExtensionData( ), a value of the field ExtDataType is set to "0x1000" and a value of the field ExtDataVersion is set to "0x0100". The values written in the field ExtDataType and the field ExtDataVersion are identified by a method whereby, for example, a table which has previously been stored in a ROM (Read Only Memory) or the like is referred to on the reproducing apparatus side. The block blkIndexExtensionData( ) is stored into the areas shown by the field ExtDataStart Address and the field ExtDataLength in the block Data Block( ). In the description of the numerical value, "0x" denotes that the numerical value is expressed by a hexadecimal notation.

In the block blkIndexExtensionData( ), the character string which is formed by four characters encoded by the coding system specified in the ISO646 and indicates a kind of subsequent data is described in the field TypeIndicator. In the example of FIG. 28, the character string "IDEX" of four characters encoded by the coding system specified in the ISO646 is described in the field TypeIndicator, thereby showing that the kind of subsequent data is "IndexExtensionData".

An area "reserved" having a data length of 32 bits is arranged subsequent to the field TypeIndicator. After that, a field TableOfPlayListStartAddress having a data length of 32 bits is arranged. The field TableOfPlayListStartAddress indicates a start address of a block blkTableOfPlayList( ) in the case where the head of the block blkIndexExtensionData( ) is used as a reference.

A field MakersPrivateDataStartAddress having a data length of 32 bits is arranged subsequent to the field TableOfPlayListStartAddress and indicates a start address of a block blkMakersPrivateData( ) in the case where the head of the block blkIndexExtensionData( ) is used as a reference. A block blkUIAppInfoAVCHD( ) is arranged through an area "reserved" having a data length of 192 bits. The padding_word having a data length of 16 bits is repeated the number of times shown by the value N1. Subsequently, the block blkTableOfPlayLists( ) is arranged. Further, the padding_ word having a data length of 16 bits is repeated the number of times shown by the value N2. Then, the block blkMakersPrivateData( ) is arranged. After this block blkMakersPrivateData( ), the padding_word having a data length of 16 bits is repeated the number of times shown by the value N3.

Since the relation between the block blkUIAppInfoAVCHD( ) and the block blkMakersPrivateData( ) with the invention is weak, their explanation is omitted here.

FIG. 29 shows a syntax indicating a structure of an example of the block blkTableOfPlayLists( ). A field Length has a data length of 32 bits and the data length in a range from a position just after the field Length to the last byte of the block blkTableOfPlayList( ) is shown by the number of bytes. Subsequent to the field Length, a block blkFirstPlaybackTitlePlayLists( ) where information regarding the play list for reproducing the playback title is described and a block blkMenuTitlePlayLists( ) where information regarding the menu title is described are arranged. Since the relation between the block blkFirstPlaybackTitlePlayLists( ) and the block blkMenuTitlePlayLists with the invention is weak, their explanation is omitted here.

Subsequently, a fieldNumberOfTitlePlayListPair having a data length of 16 bits is arranged. The number of play lists for reproducing the titles other than the playback title and the menu title is described in the field NumberOfTitlePlayListPair. In accordance with the next "for loop sentence", blocks blkMovieTitlePlayListPair( ) of only the number shown in the fieldNumberOfTitlePlayListPair are described. The block blkmovieTitlePlayListPair( ) includes a field PlayListFileName, a field PlayListAttribute, and a field RefToTitleID. That is, in the block blkMovieTitlePlayListPair( ), with respect to the [i]th play list shown in the "for loop sentence", information of the play list constructed by a file name of this play list, attributes allocated to the play list, and a reference title ID of the play list is structured.

Arranging order by the "for loop sentence" is set to recording order. That is, when one play list is added, a value of the field NumberOfTitlePlayListPair is increased by one. Information of the added play list is added after the information of the existing play list.

The field PlayListFileName has a data length of 40 bits (5 bytes) and the file name of the play list is encoded by the coding system specified in the ISO646 and is described. Subsequent to the field PlayListFileName, the field PlayListAttribute is arranged through an area "reserved" having a data length of 6 bits. The field PlayListAttribute has a data length of 2 bits and indicates the attributes allocated to the play list. According to factors of forming the play list, the play list is classified into the following three kinds: a first kind corresponding to the play list which is formed together with the creation of the clip; a second kind corresponding to the play list which is formed by using the existing titles or a part or the whole of the play list; and a third kind which is used to reproduce the menu. The corresponding attribute "Real" (first kind), attribute "Virtual" (second kind), and attribute "Menu" (third kind) are allocated to each play list according to the kind of play list.

Hereinbelow, the play list to which the attribute "Real" has been added is properly called a real play list, the play list to which the attribute "Virtual" has been added is properly called a virtual play list, and the play list to which the attribute "Menu" has been added is properly called a menu play list, respectively.

The ID (number) of the title to which the play list shown in the field PlayListFileName in the same loop belongs upon creation is described in the field RefToTitleId. As a more specific example, a corresponding value title_id in a block blkIndexes( ) in the index file "index.bdmv" is described. When the relevant play list is reproduced only from the first playback title, the value of the field RefToTitleId is set to the first fixed value, for example, "0xFFFF". When the relevant play list is reproduced only from the menu title, the value of the field RefToTitleId is set to the second fixed value, for example, "0xFFFE".

Subsequently, a virtual player will be specifically described. When the disc having the data structure as mentioned above is loaded into the player, the player needs to convert a command described in the movie object or the like read out of the disc into a peculiar command for controlling hardware in the player. In the player, software for performing such a conversion has previously been stored in a ROM (Read Only Memory) built in the player. Such software is called a virtual player because it makes the player operative in accordance with the regulations of an AVCHD format by intervening the disc and the player.

Figures 30A, 30B:
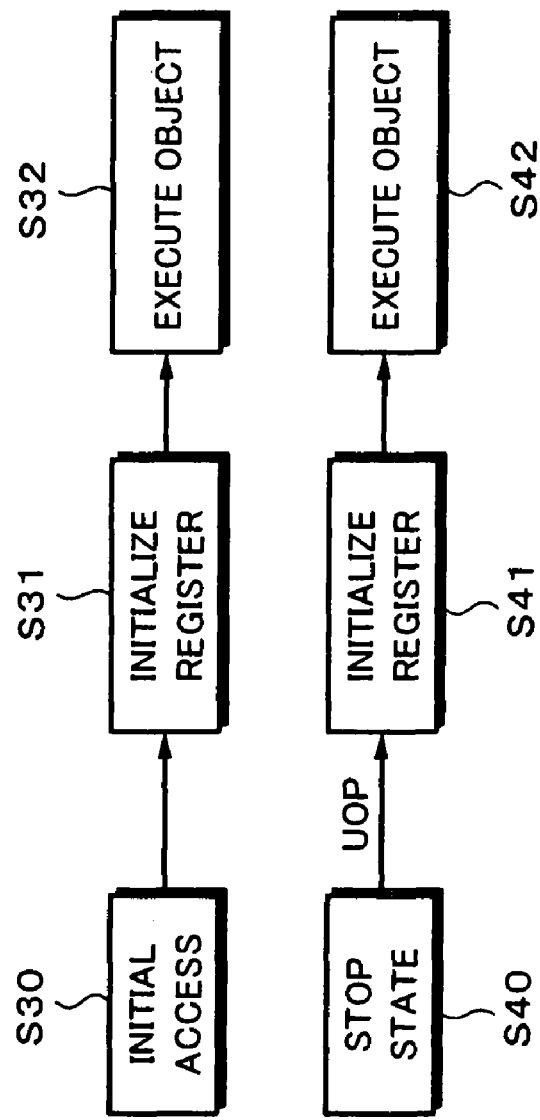
FIGS. 30A and 30B are flowcharts schematically showing the operation of a virtual player.

FIGS. 30A and 30B schematically show the operation of the virtual player. FIG. 30A shows an example of the operation upon loading of the disc. When the disc is loaded into the player and an initial access to the disc is performed (step S30), a register in which a common parameter which is used in common in one disc is stored is initialized (step S31). In next step S32, a program described in the movie object or the like is read out of the disc and executed. The initial access denotes that the reproduction of the disc is executed for the first time when the disc is loaded, or the like.

FIG. 30B shows an example of the operation in the case where, for example, a play key is depressed and the reproduction is instructed by the user from a stop state of the player. To the first stop state (step S40), the reproduction is instructed by the user by using, for example, a remote control commander or the like (UO: User Operation). When the reproduction is instructed, first, the register, that is, the common parameter is initialized (step S41). In next step S42, the processing routine advances to a movie object executing phase.

The reproduction of the play list in the movie object executing phase will be described with reference to FIG. 31. A case where an instruction to start the reproduction of content of a title No. #1 is made by the UO or the like will be considered. In response to a reproduction start instruction of the content, the player obtains the number of the object corresponding to the reproduction of the content of the title No. #1 with reference to an index table (Index Table) shown in FIG. 2 mentioned above. For example, assuming that the number of the object to realize the reproduction of the content of the title No. #1 is equal to #1, the player starts to execute the movie object #1.

Figure 31:
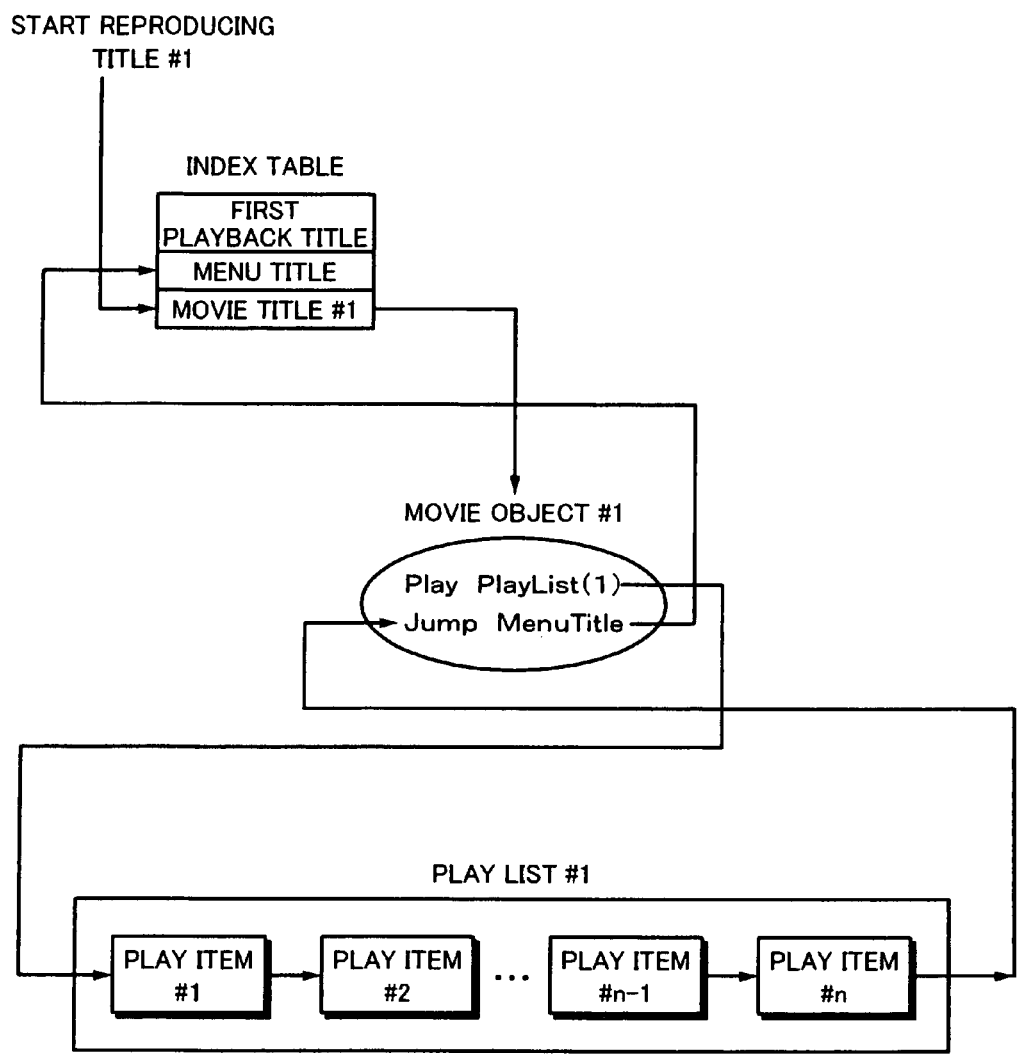
FIG. 31 is a schematic diagram schematically showing the operation of the virtual player.

In the example of FIG. 31, the program described in the movie object #1 is constructed by two lines and the command of the first line is assumed to be "PlayPlayList(1)", the player starts the reproduction of the play list #1. The play list #1 is constructed by one or more play items. The play items in the play list #1 are sequentially reproduced. When the reproduction of the play items in the play list #1 is finished, the processing routine is returned to the execution of the movie object #1 and the command of the second line is executed. In the example of FIG. 31, the command of the second line is "jump MenuTitle", this command is executed, and the execution of the movie object to realize the menu title (MenuTitle) described in the index table is started.

An embodiment of the invention will now be described. In the invention, the operation in a range from the recording start to the recording end of a video signal is defined as one recording unit, and a stream constructed by video data which is formed in an interval of one recording unit is recorded as one stream file onto the recording medium. An audio signal recorded in association with the recording of the video signal can be contained in the stream file. A clip is constructed on the basis of the stream file corresponding to one recording unit.

In the embodiment of the invention, one clip is referred to from one play item and whenever the clip is formed, the play items which refer to the formed clip are sequentially added to the play list. At this time, in the play list, a play list mark is stamped every play item, that is every clip. It is constructed so that, for example, only one play list exists in one recording medium. The invention is not limited to such a construction but a plurality of play lists may exist on the disc.

Figure 32:
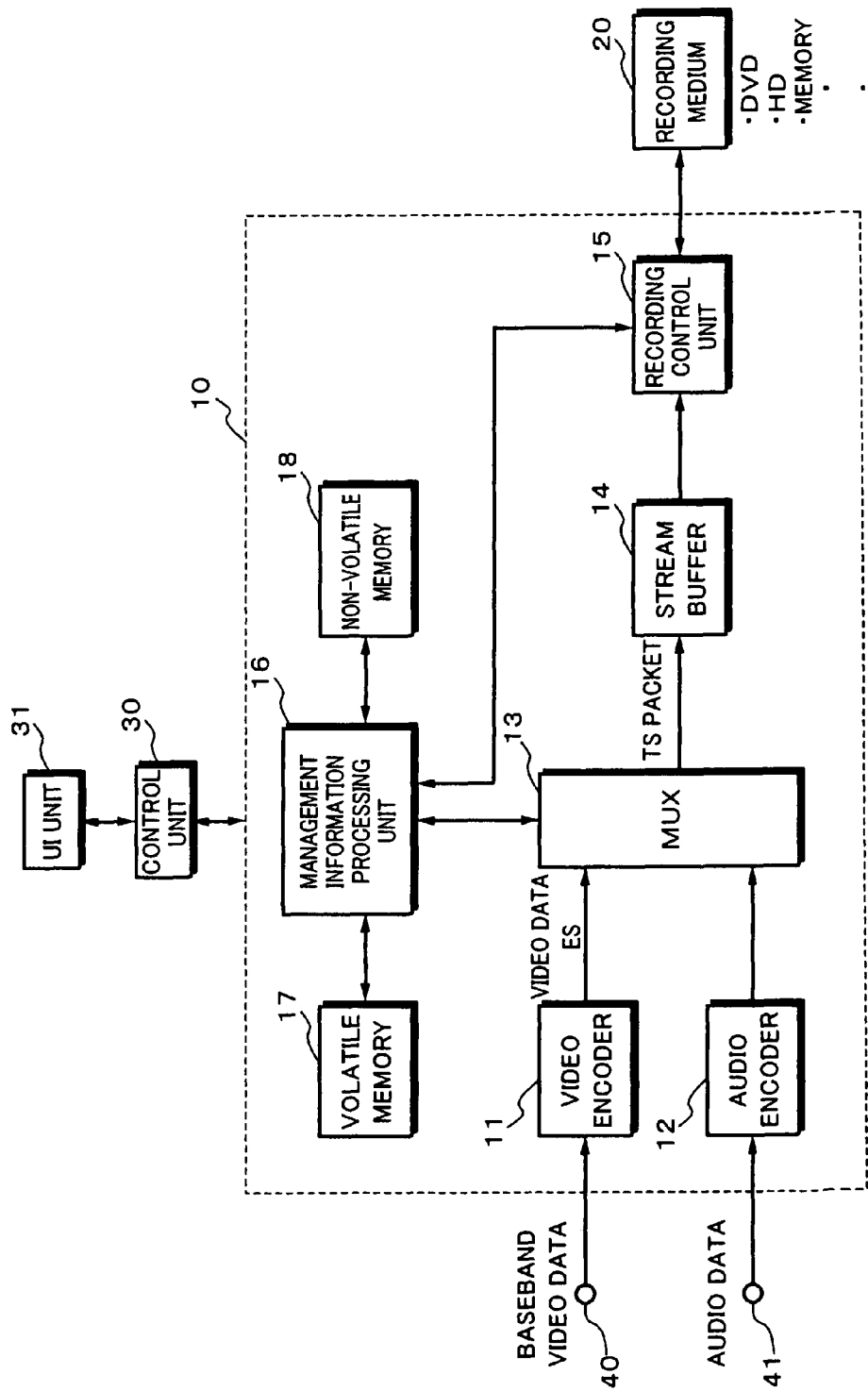
FIG. 32 is a block diagram schematically showing a construction of an example of a recording apparatus which can be applied to the embodiment of the invention.

FIG. 32 schematically shows a construction of an example of a recording apparatus which can be applied to the embodiment of the invention. According to this recording apparatus, an AV stream in which inputted digital video data and digital audio data have been compression-encoded and multiplexed by a predetermined system is recorded onto the recording medium. As compression-encoding system and the multiplexing system, for example, the systems specified in the foregoing AVCHD format can be applied.

The recording apparatus shown as an example in FIG. 32 can be also used as a single recording apparatus for recording the video data and audio data which are inputted from the outside onto the recording medium. The recording apparatus is combined with a camera block having an optical system, an image pickup device, and the like and can be also used as a recording block of a video camera apparatus for recording the video data based on an image pickup signal obtained by photographing an object onto the recording medium.

Various systems are considered as applicable compression-encoding system and multiplexing system. For example, the system specified in the H.264|AVC can be applied as a compression-encoding of the embodiment of the invention. The invention is not limited to such a system but the compression-encoding can be also executed on the basis of the MPEG2 systems. For example, the MPEG2 systems can be applied as a multiplexing system. Explanation will be made hereinbelow on the assumption that the compression-encoding of the video data is executed according to the system specified in the H.264|AVC and the multiplex of the video data and the audio data is executed according to the system specified in the MPEG2 systems.

A control unit 30 is constructed by, for example, a CPU (Central Processing Unit), a RAM (Random Access Memory), a ROM (Read Only Memory), and the like (not shown). The control unit 30 uses the RAM as a work memory and controls each section in a recording unit 10 of the recording apparatus on the basis of programs and data which have previously been stored in the ROM. A path connecting the control unit 10 and each section in the recording unit 10 is omitted in FIG. 32 for avoiding complexity.

An operator for allowing the user to operate the operation of the recording apparatus is properly provided for a UI (User Interface) unit 31 and the UI unit 31 outputs a control signal according to the operation to the operator. The control signal is supplied to the control unit 30. The control unit 30 controls the operation of each section in the recording unit 10 by processes of the program which are executed based on the control signal supplied from the UI unit 31 in accordance with the user operation. For example, in accordance with the operation executed to the UI unit 31, the operations to start and stop the recording operation by the recording apparatus are controlled by the control unit 30.

Digital video data of a base band is inputted from a terminal 40. In association with the digital video data, digital audio data of a base band is inputted from a terminal 41.

The digital video data is inputted from the terminal 40 to the recording unit 10 and supplied to a video encoder 11. The video encoder 11 compression-encodes the supplied digital video data by a predetermined system. In this example in which the compression-encoding is executed according to the system specified in the MPEG4 AVC|H.264, for example, an intraframe compression is performed by both of a DCT (Discrete Cosine Transform) and an intrapicture prediction, an interframe compression using a motion vector is executed, and further, an entropy encoding is executed, thereby raising a compression efficiency. The digital video data which has been compression-encoded in the video encoder 11 is supplied as an elementary stream (ES) of MPEG4 to a multiplexer (MUX) 13.

The digital audio data is inputted from the terminal 41 to the recording unit 10 and supplied to an audio encoder 12. The audio encoder 12 is compression-encoded by a predetermined compression-encoding system, for example, an AAC (Advanced Audio Coding). The compression-encoding system of the audio data is not limited to the AAC but a case where the audio data is not compression-encoded but is used as data of the base band as it is also considered. The compression-encoded digital audio data is supplied to the multiplexer 13.

The multiplexer 13 multiplexes the digital video data and digital audio data each of which has been compression-encoded and supplied by a predetermined system and outputs the multiplexed data as one data stream. In the example in which the multiplex is performed according to the MPEG2 systems, the supplied compression video data and compression audio data are time-divisionally multiplexed by using the transport stream of MPEG2. For example, the multiplexer 13 has a buffer memory and stores the supplied compression video data and compression audio data into the buffer memory.

The compression video data stored in the buffer memory is divided every predetermined size, a header is added to each divided data, and such data is PES (Packetized Elementary Stream) packetized. Similarly, the compression audio data is also divided every predetermined size, a header is added to each divided data, and such data is PES packetized. Predetermined information specified in the MPEG2 system, such as PTS showing a reproducing time of the data which is stored in the packet or DTS (Decoding Time Stamp) showing decoding time is stored in the header. The PES packet is further divided and inserted into a payload of the transport packet (TS packet). A PID (Packet Identification) to identify the data inserted into the payload is stored in a header of the TS packet. The TS packet outputted from the multiplexer 13 is temporarily stored into a stream buffer 14.

Actually, a header of a predetermined size is further added to the TS packet in the multiplexer 13 and the resultant packet is outputted. The packet obtained by adding the predetermined header to the TS packet is called a source packet.

A recording control unit 15 controls the recording of the data to a recording medium 20. For example, a recordable type DVD (Digital Versatile Disc) can be used as a recording medium 20. The invention is not limited to such a medium but a hard disk drive can be used as a recording medium 20 or a semiconductor memory may be applied to the recording medium 20. It is also considered to apply a Blu-ray Disc (registered trademark) which realizes a larger capacity as a recording medium 20.

The recording control unit 15 monitors an amount of data stored in the stream buffer 14. When the data of a predetermined amount or more is stored into the stream buffer 14, the recording control unit 15 reads out the data of an amount corresponding to the recording unit of the recording medium 20 from the stream buffer 14 and writes into the recording medium 20.

A management information processing unit 16 is constructed by, for example, a CPU, a RAM serving as a work memory, and a ROM in which a program and predetermined data have previously been stored (they are not shown). The invention is not limited to such a construction but, for example, the function of the management information processing unit 16 can be also realized by a program process in the control unit 30. In this case, for example, the RAM held in the control unit 30 is used as a volatile memory 17 and a non-volatile memory 18 is connected to the control unit 30.

The management information processing unit 16 uses the volatile memory 17 as a work memory and forms information to be stored into the foregoing index file "index.bdmv", movie object file "MovieObject.bdmv", play list file "xxxxx.mpls", and clip information file "zzzzz.clpi" on the basis of the recording data. The formed information is written into the recording medium 20 at predetermined timing.

For example, the management information processing unit 16 obtains the time information of the recording data from the multiplexer 13, obtains the address information of the recording data to the recording medium 20 from the recording control unit 15, and forms EP_map information on the basis of the obtained time information and address information. Creation or updating of the play list file "xxxxx.mpls", creation of the clip information file "zzzzz.clpi", and the like are executed on the basis of the control signals which are outputted from the control unit 30 in response to the operation of the recording start and the recording end to the UI unit 31 and on the basis of the information regarding the recording data from the multiplexer 13 and the recording control unit 15. Further, when the recording is newly executed to the recording medium 20, creation or updating of the index file "index.bdmv" and the movie object file "MovieObject.bdmv" is executed.

Figure 33:
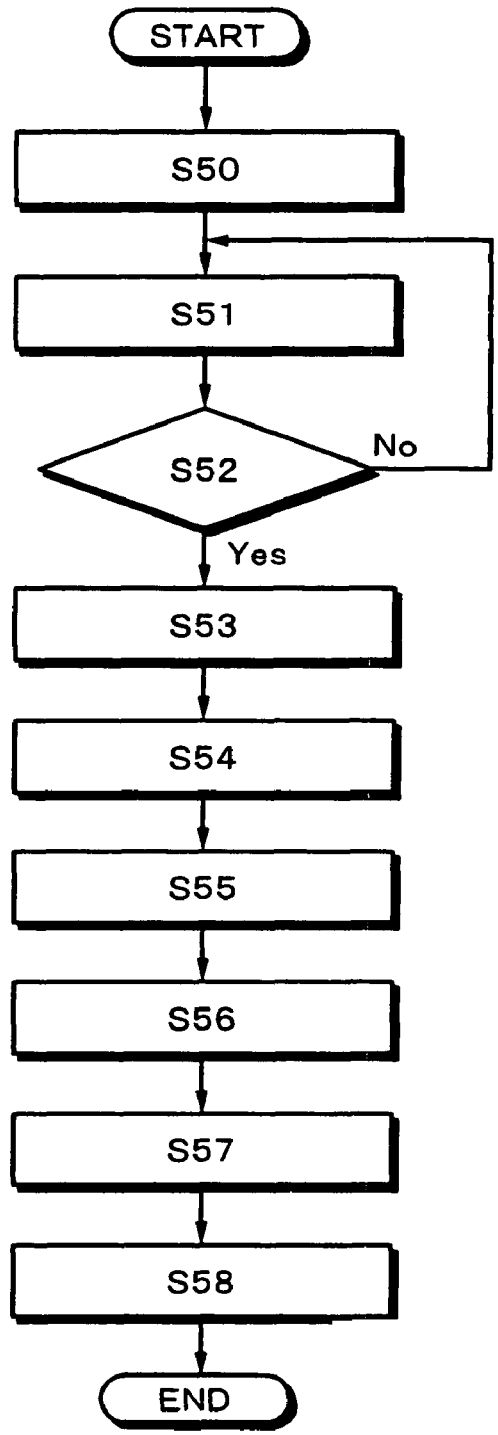
FIG. 33 is a flowchart showing a recording method of an example of a clip according to the embodiment of the invention.

Subsequently, the recording method of the clip according to the embodiment of the invention will be described. FIG. 33 is a flowchart showing the recording method of an example of the clip according to the embodiment of the invention. It is now assumed that prior to executing the processes according to this flowchart, the clip and the files (clip information file, play list file, movie object file, index file, etc.) in which reproduction control information for reproducing the clip had been stored have already been recorded on the recording medium 20.

When the recording starting operation is executed in step S50, the recording of the clip AV stream to the recording medium 20 is started in next step S51.

The recording starting operation is executed, for example, as follows. For example, a recording start switch to instruct the recording start and a recording stop switch to instruct the recording stop are provided for the UI unit 31. In step S50, the recording start switch is operated by the user. In accordance with this operation, the control signal to instruct the recording start is outputted from the UI unit 31 and supplied to the control unit 30. On the basis of the control signal to instruct the recording start, the control unit 30 controls each unit in the recording unit 10 so that the video data of the base band which is inputted from the terminal 40 and the audio data of the base band which is inputted from the terminal 41 are recorded onto the recording medium 20.

As an example of the control by the control unit 30 regarding the recording start, there is considered a case where the operations of the video encoder 11 and the audio encoder 12 are stopped in the recording stop state and the operations of the video encoder 11 and the audio encoder 12 are started in response to the recording starting instruction. The invention is not limited to such a construction but the control of the recording start and stop can be also made by controlling the start and stop of the operations of the multiplexer 13, stream buffer 14, and recording control unit 15.

The clip AV stream is recorded onto the recording medium 20 in accordance with the control of the recording start (step S51). That is, the inputted video data and audio data are compression-encoded by the video encoder 11 and the audio encoder 12, converted into the TS packet (actually, the source packet to which the predetermined header has been further added) by the multiplexer 13, and supplied to the stream buffer 14. When the TS packets of a predetermined amount or more have been stored into the stream buffer 14, the TS packet is read out of the stream buffer 14 by the recording control unit 15. The read-out TS packet is stored into the clip AV stream file added with the predetermined file name and recorded onto the recording medium 20.

For example, if the clip AV stream file having the file name "00001.m2ts" has already been recorded in the recording medium 20, a file name which is not overlapped with the file which has already been recorded is selected as a file name of an clip AV stream file which is newly recorded and set to, for example, "00002.m2ts".

In association with the recording of the clip AV stream to the recording medium 20, information showing a correspondence relation between the reproducing time and the address of the data to be recorded is formed in a real-time manner by the management information processing unit 16. This data is stored into the volatile memory 17 as data which is stored into the block blkEPMap( ) in the clip information file "zzzzz.clpi" mentioned above. As a backup of such data, the same data can be also stored into the non-volatile memory 18.

In next step S52, whether or not the recording stopping operation has been executed is discriminated. For example, if it is determined that the recording stop switch provided for the UI unit 31 has been operated by the user and the recording has been stopped, the processing routine advances to step S53. If the recording is not stopped, the processing routine is returned to step S51 and the recording of the clip AV stream to the recording medium 20 is continued.

In step S53, all of the streams stored in the stream buffer 14 are written into the recording medium 20 in association with the recording stop. For example, the recording control unit 15 reads out all of the streams (TS packets) stored in the stream buffer 14 and writes them into the recording medium 20 in response to a recording stop instruction from the control unit 30.

For example, the operations of the video encoder 11 and the audio encoder 12 are stopped in response to the recording stop instruction. At this time, to perform the first seamless connection described with reference to FIG. 13A, for example, control is made so as to stop the operation of the audio encoder 12 after the elapse of a predetermined time from the stop of the operation of the video encoder 11.

In next steps S54 to S58, a clip information file regarding the clip AV stream file written in the recording medium 20 is formed and the play list file is updated by the management information processing unit 16.

First, in step S54, the clip information file "zzzzz.clpi" is formed by the management information processing unit 16. The file name is set to, for example, the file name corresponding to the file name of the clip AV stream file shown by the clip information file. If the file name of the clip AV stream file is equal to "00002.m2ts", the file name of this clip information file is set to the file name "00002.clpi" in which the portion before the extension is the same.

In accordance with each syntax shown as an example in FIGS. 15 to 21, the values of each field and flag are properly set and stored into the clip information file "00002.clpi". For example, information regarding the TS packet and information regarding the reproducing time (PTS) are formed by the management information processing unit 16 on the basis of the information obtained from the multiplexer 13 during the recording of the clip. Information regarding the recording address on the recording medium 20 is formed by the management information processing unit 16 on the basis of the information obtained from the recording control unit 15 during the recording of the clip. The value peculiar to the system is based on, for example, information which has previously been stored in a ROM (not shown) or the like. Further, information of the foregoing block blkEPMap( ) showing the correspondence relation between the reproducing time and the address is stored into the block blkCPI( ) of the clip information file "00002.clpi".

When the recording of the clip is stopped by the user operation, the flag IsCC5 in the block blkClipInfo( ) is set to the value "1" (binary value). In association with it, the data shown by the "if sentence" (refer to FIG. 16) in the block blkClipInfo( ) is set to a predetermined value.

After the creation of the clip information file is completed, the processing routine advances to step S55. Processes of steps S55 to S58 are processes regarding the play list file. By the processes of steps S55 to S58, a play item corresponding to the newly-recorded clip AV stream file "00002.m2ts" is added to the play list file already existing on the recording medium 20.

First, in step S55, a value of the field ConnectionCondition in the block blkPlayItem( ) in the play list file is set to 5 and it is shown that the first seamless connection is performed between this clip and the next clip (refer to FIG. 12). In next step S56, a value of the field NumberOfPlayItems in the play list file is increased by one and it is shown that one play item is added to the play list (refer to FIG. 11).

In next step S57, the field ClipInformationFileName, field INTime, and field OUTTime in the block blkPlayItem( ) are set, respectively, and the block blkPlayItem( ) to which the data is added in association with the recording of the clip is formed. The file name "00002.clpi" of the clip information file formed in step S55 mentioned above is stored in the field ClipInformationFileName. Actually, since the extension of the clip information file is fixed, the portion "00002" before the period is stored. The field INTime and the field OUTTime are information showing time at the head and end of a video stream stored in the corresponding clip AV stream file "00002.m2ts" and are based on the information of, for example, the block blkEPMap( ) in the block blkCPI( ) in the clip information file "00002.clpi".

In next step S58, a value of the field NumberOfPlayListMarks in the block blkPlayListMark( ) in the play list file is increased by one. In association with it, the value of the field MarkTimeStamp added to the "for loop sentence" is set to the value of the field INTime in the block blkPlayItem( ) in step S57 mentioned above. That is, the play list mark is stamped to the head of the clip which was newly recorded.

The clip information file "00002.clpi" is formed for the clip AV stream file "00002.m2ts" which was newly recorded and the existing play list file is updated.

The writing process of the data stored in the stream buffer 14 onto the recording medium 20 in step S53 mentioned above may be executed after the process of step S58.

By executing the recording starting operation to the UI unit 31 in the recording stop state, the process is started again from step S50. The recording of a new clip AV stream file onto the recording medium 20, the creation of the corresponding clip information file, the creation of the play item which refers to the formed clip information file, and the adding process of the formed play item to the play list are similarly executed.

In the case where after the recording was temporarily stopped, the next recording is started, until the writing of the clip information file formed in step S54 mentioned above onto the recording medium 20 is finished, the recording of the next clip AV stream file is not started.

In this case, there is a possibility that after the recording was stopped, the next recording is not started. To avoid such a situation, for example, the following method is considered. For example, the clip information file is held in the volatile memory 17 used as a work memory to form the clip information file and the clip information file held in the volatile memory 17 is written on to the recording medium 20 at predetermined timing such as disc ejection, turn-off of a power source of the recording apparatus, or the like.

The explanation has been made here with respect to the example in which the next clip AV stream file is recorded in the state where the clip AV stream file, the corresponding clip information file, and the play list file have already been recorded onto the recording medium 20. However, the processes described with reference to the flowchart of FIG. 33 can be also applied to the case of recording the first clip AV stream file onto the recording medium 20.

According to the AVCHD format, the play list file in which the play item which refers to the clip AV stream file is stored, the movie object file in which the command to call the play list file has been described as a movie object, and the index file for calling the movie object in the movie object file as a title are necessary here. When the first clip AV stream file is recorded onto the recording medium 20, the index file and the movie object file can be automatically formed.

Figure 34:
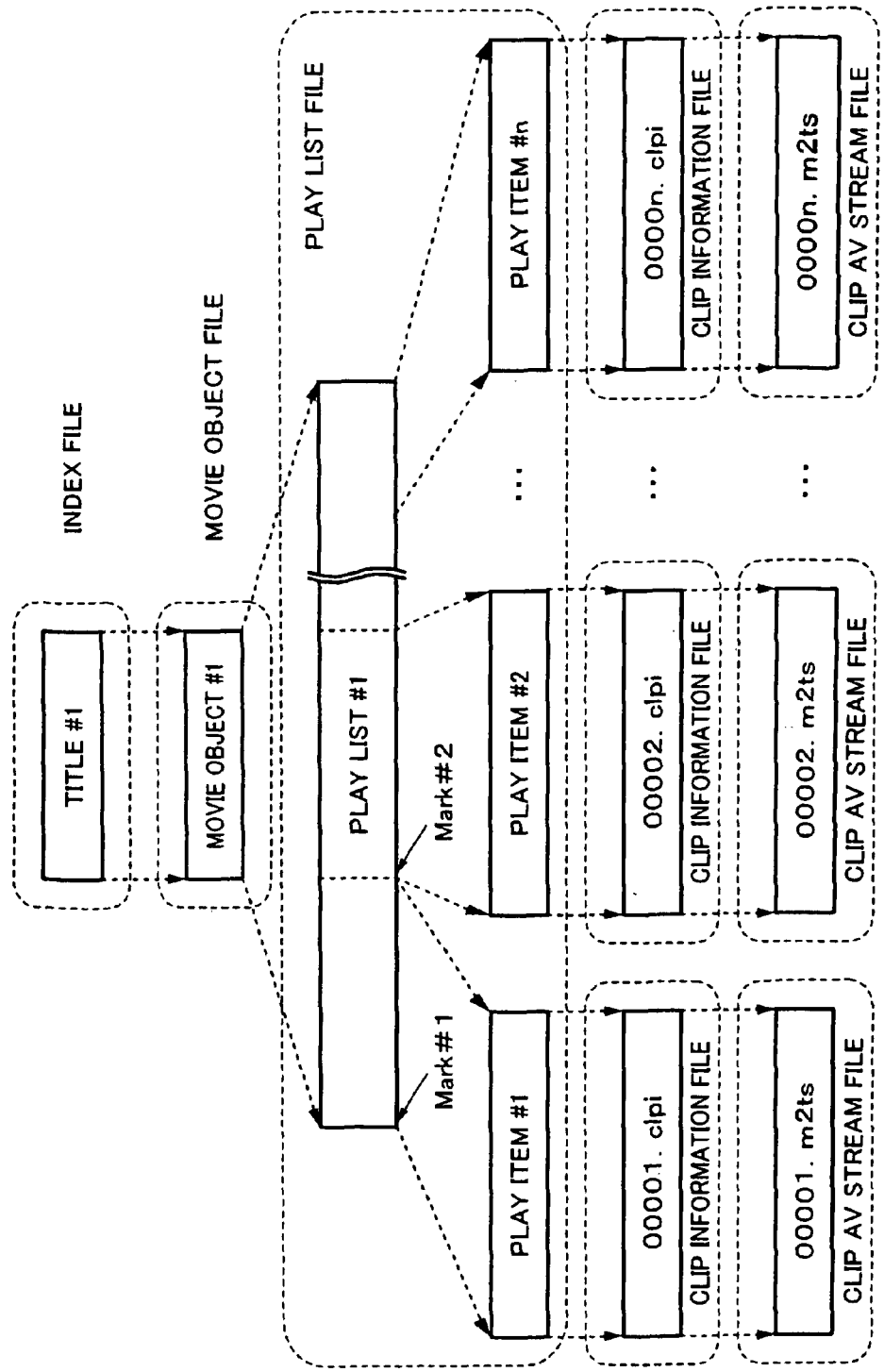
FIG. 34 is a schematic diagram showing a file structure of an example recorded by the method of the embodiment of the invention.

FIG. 34 shows a file structure of an example formed according to the foregoing procedure of FIG. 33. For example, the first clip AV stream file "00001.m2ts" is recorded onto the recording medium 20 (steps S50 to S53). The corresponding clip information file "00001.clpi" is formed (step S54).

In accordance with the recording and creation of the clip AV stream file "00001.m2ts" and the clip information file "00001.clpi", the information of the play item #1 which refers to the clip information file "00001.clpi" is subsequently formed and the play list file in which the play item #1 is stored is formed (steps S55 to S58). A play list mark Mark #1 is stamped to the play list file at time corresponding to the field INTime of the play item #1 (step S58).

In accordance with the recording of the first clip AV stream file "00001.m2ts", the movie object file in which the movie object #1 to call the play list #1 is described and the index file for selecting and reproducing the movie object #1 as a title #1 can be formed. As for the movie object file and the index file, it is also possible to preliminarily form a template and update it. Since a relation between the creation of the movie object file and the index file with the invention is weak, its detailed explanation is omitted.

Subsequently, when the recording starting operation is executed, the clip AV stream file "00002.m2ts" and the corresponding clip information file "00002.clpi" are additionally recorded onto the recording medium 20 (steps S50 to S53 and step S54). In association with the recording and creation of the clip AV stream file "00002.m2ts" and the clip information file "00002.clpi", a play item #2 which refers to the clip information file "00002.clpi" is subsequently formed. The formed play item #2 is added to the play list file which has already been formed. Further, a play list mark Mark#2 is stamped at the time corresponding to the field INTime of the play item #2 (step S58).

As mentioned above, one clip AV stream file is recorded onto the recording medium 20 by a set of the recording starting operation and the recording stopping operation. In association with it, a clip information file corresponding to the clip AV stream file is formed. A play item which refers to the clip information file is formed and added to the existing play list. The play list mark is stamped at the time shown by the field INTime of the relevant play item. A series of processes is repeated every set of the recording starting operation and the recording stopping operation.

As will be understood from the file structure shown as an example in FIG. 34, a plurality of play items which refers to each of a plurality of clip AV stream files which is recorded by the repetition of the set of the recording starting operation and the recording stopping operation is sequentially additionally stored into one play list file in association with the recording of the clip AV stream file. This play list is called from one movie object in the movie object file. The movie object is selected as one title from the index file and reproduced. Therefore, a plurality of clip AV stream files which is recorded by the repetition of the series of sets of the recording starting operation and the recording stopping operation is managed as one title on the index file.

Subsequently, another example of the embodiment of the invention will be described. The example in which the invention is applied to the single recording apparatus has been described above (refer to FIG. 32). On the other hand, in another example of the embodiment, the invention is applied to a video camera apparatus which has an image pickup device and an optical system for allowing light from an object to enter the image pickup device and records video data onto the recording medium on the basis of an image pickup signal obtained by photographing the object by the image pickup device.

FIG. 35 shows a construction of an example of a video camera apparatus 100 according to another example of the embodiment of the invention. In the video camera apparatus 100, since the construction of the recording apparatus described with reference to FIG. 31 can be applied almost as it is to a construction of a recording system, portions common to, those in FIG. 31 are designated by the same reference numerals and their detailed explanation is omitted here.

In the construction of FIG. 35, as a construction regarding a video signal, a camera unit 50 has: an optical system 51; an image pickup device 52; an image pickup signal processing unit 53, a camera control unit 54, and a display unit 55. As a construction regarding an audio signal, the camera unit 50 has: a microphone (MIC) 56 and an audio signal processing unit 57. The control unit 30 transmits and receives various control signals and information to/from each unit in the camera unit 50 and controls the operation of the camera unit 50. The control unit 50 controls the operation of the camera unit 50 on the basis of the control signal which is supplied from the UI unit 31 in accordance with the user operation.

In the case where the invention is constructed as a video camera apparatus 100, the recording starting operation and the recording stopping operation are generally executed in such a manner that, for example, a single recording switch provided for the UI unit 31 is used and each time the recording switch is depressed, the recording start and the recording stop are alternately instructed. It is assumed that a disk recording medium such as Blu-ray Disc or recordable type DVD is applied as a recording medium 20 in the video camera apparatus 100.

In the camera unit 50, the optical system 51 has: a lens system for guiding light from the object to the image pickup device 52; a diaphragm adjusting mechanism; a focus adjusting mechanism; a zooming mechanism; a shutter mechanism; and the like. The operations of the diaphragm adjusting mechanism, focus adjusting mechanism, zooming mechanism, and shutter mechanism are controlled by the camera control unit 54 on the basis of the control signals which are supplied from the control unit 30.

The image pickup device 52 is constructed by, for example, a CCD (Charge Coupled Device), converts the light irradiated through the optical system 51 into an electric signal by photoelectric conversion, executes predetermined signal processes, and outputs the processed signal as an image pickup signal. The image pickup signal processing unit 53 executes predetermined signal processes to the image pickup signal outputted from the image pickup device and outputs the processed signal as digital video data of a base band.

For example, in the image pickup signal processing unit 53, only the signal having image information is sampled by a CDS (Correlated Double Sampling) circuit from the image pickup signal outputted from the image pickup device 52, noises are removed, and a gain is controlled by an AGC (Auto Gain Control) circuit. The signal is converted into a digital signal by A/D conversion. The image pickup signal processing unit 53 executes a signal process of a detecting system to the digital signal, extracts color components of R (red), G (green), and B (blue), executes processes such as γ correction, white balance correction, and the like, and finally outputs the processed signal as digital video data of one base band.

The image pickup signal processing unit 53 transmits information of the image pickup signal outputted from the image pickup device 52 to the control unit 30. On the basis of such information, the control unit 30 forms a control signal to control the optical system 51 and supplies to the camera control unit 54. On the basis of such a control signal, the camera control unit 54 controls the focus adjusting mechanism, the diaphragm adjusting mechanism, and the like.

Further, on the basis of the image pickup signal outputted from the image pickup device 52, the image pickup signal processing unit 53 forms a video signal to be displayed onto the display unit 55 using, for example, an LCD (Liquid Crystal Display) as a display device.

The microphone 56 collects surrounding audio sounds, converts into an electric signal, and outputs it. An audio signal outputted from the microphone 56 is supplied to the audio signal processing unit 57. The audio signal processing unit 57 transmits the supplied audio signal through a limiter, A/D converts into digital audio data, executes predetermined audio signal processes such as noise removal, sound quality correction, and the like, and outputs the processed signal as digital audio data of a base band.

The digital video data of the base band outputted from the image pickup signal processing unit 53 in the camera unit 50 is supplied to the terminal 40 of the recording unit 10. The digital audio data of the base band outputted from the audio signal processing unit 57 is supplied to the terminal 41 of the recording unit 10.

When the recording switch provided for the UI unit 31 is depressed in the recording stop state, the control signal for instructing the recording start is supplied from the UI unit 31 to the control unit 30. The recording of the digital video signal and the digital audio data of the base band outputted from the camera unit 50 onto the recording medium 20 is started on the basis of the control of the control unit 30.

That is, as already described, the operations of the video encoder 11 and the audio encoder 12 are started on the basis of the control of the control unit 30. The video data and the audio data are compression-encoded by the video encoder 11 and the audio encoder 12 and properly packetized and multiplexed in the multiplexer 13, respectively. The AV stream data is derived. The AV stream data is supplied to the recording control unit 15 through the stream buffer 14 and recorded as a clip AV stream file onto the recording medium 20.

When the recording switch in the UI unit 31 is depressed, the recording is stopped, the clip information file is formed, and the play list file is updated. On the basis of the information from the multiplexer 13 and the recording control unit 15, the management information processing unit 16 forms a clip information file corresponding to the clip AV stream file recorded on the recording medium 20. The management information processing unit 16 forms a play item which refers to the clip information file. If the play list has already existed, the management information processing unit 16 adds the formed play item to the play list and stamps the play list mark to the play list.

If the recording switch is again depressed in this state, the recording start is again instructed and the recording of a new clip AV stream file onto the recording medium 20 is started. The processes such as creation of the corresponding clip information file, creation of the play item which refers to the clip information file, addition of the formed play item to the play list, and the like are executed. The reproduction between the clip AV stream files is executed by connecting the clip AV streams by the first seamless connection.

In the case of the system in which in association with the recording stop, the formed clip information file is written onto the recording medium 20 just after the creation of the clip information file, control is made so that the next recording is not started until the writing of the clip information file formed just before onto the recording medium 20 is finished.

Like another example of the embodiment, in the case of applying the invention to the video camera apparatus 100, such a construction that the play list file is restricted so that only one file exists on the one recording medium 20 is considered. That is, it is constructed in such a manner that only one title for reproducing the play list exist on one recording medium 20 unless otherwise an editing process or the like is executed. By this method, the video camera apparatus 100 using the disc as a recording medium 20 can be handled as if it were a video camera apparatus using a conventional magnetic tape as a recording medium.

That is, according to another example of the embodiment, the clip AV streams which are individually recorded are managed by one play list and the reproduction between the clip AV stream files is executed by connecting the clip AV streams by the first seamless connection. Therefore, all of the clip AV stream files recorded on the recording medium 20 can be continuously reproduced as in the case of reproducing the magnetic tape. Since the play list mark has been stamped to the play list at a position corresponding to the head of the clip AV stream file which is individually recorded, the search can be easily performed on a clip unit basis.

Although the explanation has been made above on the assumption that the recording apparatus shown in FIG. 31 and the recording unit 10 of the video camera apparatus 100 shown in FIG. 35 are constructed in a hardware manner, the invention is not limited to such an example. That is, the recording unit 10 can be also constructed as software. In this case, the software is preliminarily stored in, for example, a ROM (not shown) held in the control unit 30. The invention is not limited to such a method but the recording unit 10 can be also constructed in a computer apparatus such as a personal computer or the like. In this case, software for allowing the computer apparatus to execute the recording unit 10 is recorded into a recording medium such as CD-ROM or DVD-ROM and provided. If the computer apparatus can be connected to the network, the software can be also provided through the network such as Internet or the like.

DESCRIPTION OF REFERENCE NUMERALS

10 RECORDING UNIT
11 VIDEO ENCODER
12 AUDIO ENCODER
13 MULTIPLEXER
14 STREAM BUFFER
15 RECORDING CONTROL UNIT
16 MANAGEMENT INFORMATION PROCESSING UNIT
17 VOLATILE MEMORY
18 NON-VOLATILE MEMORY
20 RECORDING MEDIUM
30 CONTROL UNIT
31 USER INTERFACE UNIT
50 CAMERA UNIT
100 VIDEO CAMERA APPARATUS
S10 OBTAIN LENGTH OF RECORDING DATA AND SET INTO VALUE OF ExtDataLength(n+1)
S11 EXAMINE ExtDataLength AND ExtDataStartAddress FROM ext_data_entry( ) IN WHICH PRESENT blkExtensionData( ) HAS BEEN LISTED, THEREBY KNOWING USING SITUATION IN DataBlock S12 CONTINUOUS EMPTY AREA OF ExtDataLength(n+1) OR MORE EXISTS IN DataBlock?
S13 INCREASE Length VALUE IN blkExtensionData( ), AND FORM CONTINUOUS EMPTY AREA OF ExtDataLength(n+1) OR MORE
S14 DECIDE HEAD ADDRESS OF DATA STORING AREA, AND SET TO ExtDataStartAddress(n+1)
S15 WRITE DATA OF LENGTH OF ExtDataLength(n+1) FROM ADDRESS SHOWN BY ExtDataStartAddress(n+1)
S16 ADD ExtDataLength(n+1) AND ExtDataStartAddress(n+1) TO ext_data_entry( )
S20 KNOW ExtDataType FROM STANDARD WITH WHICH READING DATA CONFORMS
S21 KNOW ExtDataVersion FROM TYPE OF READING DATA BASED ON ExtDataType
S22 SEQUENTIALLY READ ONE OF ext_data_entry( ) LISTED IN blkExtensionData( )
S23 ExtDataType COINCIDES WITH ExtDataVersion?
S24 READ ExtDataLength(i) AND ExtDataStartAddress(i)
S25 READ DATA OF LENGTH OF ExtDataLength(i) FROM ADDRESS SHOWN BY ExtDataStartAddress(i)
S26 READING OF ext_data_entry( ) IS FINISHED?
S27 DATA TO BE READ DOES NOT EXIST
S50 RECORDING STARTING OPERATION
S51 RECORD STREAM INTO RECORDING MEDIUM
S52 RECORDING STOPPING OPERATION?
S53 WRITE STREAM REMAINING IN STREAM BUFFER INTO RECORDING MEDIUM
S54 FORM CLIP INFORMATION FILE
S55 SET TO ConnectionCondition=5
S56 INCREASE NumberOfPlayItems BY +1
S57 SET ClipInformationFileName, INTime, AND OUTTime AND FORM blkPlayItem( )
S58 SET MarkTimeStamp TO INTime AND ADD 1 TO blkPlayListMark

The invention claimed is:

1. A recording apparatus for multiplexing video data and audio data and recording the multiplexed data onto a recording medium, comprising:
   a data input unit to which said video data and said audio data are inputted;
   a recording instruction input unit to which instructions for a recording start and a recording stop of said video data and said audio data are inputted;
   a recording unit configured to multiplex said video data and said audio data and record a multiplexed stream as a stream file onto the recording medium;
   a management information forming unit configured to, for said stream file recorded onto said recording medium, form
   an attribute file in which at least reproducing time information and address information of said stream file are made to correspond and
   a reproduction list file in which one or more reproducing interval data which designates a reproducing interval by setting a reproduction start point and a reproduction end point for said stream file is stored and in which mark information showing the reproducing time information for said stream file can be stored; and
   a control unit configured to control said recording unit and said management information forming unit,
   wherein said control unit
   controls said recording unit so as to record said video data and said audio data corresponding to an interval between the recording start and the recording stop based on the instructions of said recording instruction input unit as said one stream file onto said recording medium and controls said management information forming unit so as to form said reproducing interval data which designates said one whole stream file as a reproducing interval and store said mark information showing time information corresponding to reproduction start time which is designated by said reproducing interval data into said reproduction list file.

2. A recording apparatus according to claim 1, wherein said recording instruction input unit receives an operation of a user.

3. A recording apparatus according to claim 2, wherein said control unit
   controls in such a manner that when said corresponding attribute file is recorded just after said stream file was recorded to said recording medium, said operation for said recording start to said recording instruction input unit is not received until the recording of said attribute file is completed.

4. A recording apparatus according to claim 1, wherein said control unit
   controls in such a manner that, on the basis of the instruction of the recording stop by said recording instruction input unit, information showing that said stream file and a stream file subsequent to said stream file are continuously reproduced at frame timing is set into said reproducing interval data which designates said recorded stream file as a reproducing interval and said reproducing interval data is recorded onto said recording medium.

5. A recording apparatus according to claim 1, wherein said control unit
   controls said recording unit in such a manner that reproducing time at a head of said video data and reproducing time at a head of said audio data coincide and reproducing time at an end of said audio data is later than reproducing time at an end of said video data.

6. A recording apparatus according to claim 1, wherein said control unit
   controls said management information forming unit in such a manner that when a new stream file has been recorded onto said recording medium, said reproducing interval data corresponding to said new stream file is added to said reproduction list file.

7. A recording apparatus according to claim 6, wherein said control unit
   controls so as to form only one said reproduction list file for said one recording medium.

8. A recording method of multiplexing video data and audio data and recording the multiplexed data onto a recording medium, comprising:
   a recording instruction input step to which instructions for a recording start and a recording stop of said video data and said audio data inputted to a data input unit are inputted;
   a recording step of multiplexing said video data and said audio data and recording a multiplexed stream as a stream file onto the recording medium;
   a management information forming step of, for said stream file recorded onto said recording medium, forming
   an attribute file in which at least reproducing time information and address information of said stream file are made to correspond and
   a reproduction list file in which one or more reproducing interval data which designates a reproducing interval by setting a reproduction start point and a reproduction end point for said stream file is stored and in which mark information showing the reproducing time information for said stream file can be stored; and a control step of controlling said recording step and said management information forming step, wherein in said control step, said recording step is controlled so as to record said video data and said audio data corresponding to an interval between the recording start and the recording stop based on the instructions in said recording instruction input step as said one stream file onto said recording medium and said management information forming step is controlled so as to form said reproducing interval data which designates said one whole stream file as a reproducing interval and store said mark information showing time information corresponding to reproduction start time which is designated by said reproducing interval data into said reproduction list file.

9. A non-transitory computer readable recording memory having stored thereon a program for allowing a computer apparatus to execute a recording method of multiplexing video data and audio data and recording the multiplexed data onto a recording medium, wherein said recording method comprises:

a recording instruction input step to which instructions for a recording start and a recording stop of said video data and said audio data inputted to a data input unit are inputted;

a recording step of multiplexing said video data and said audio data and recording a multiplexed stream as a stream file onto the recording medium;

a management information forming step of, for said stream file recorded onto said recording medium, forming an attribute file in which at least reproducing time information and address information of said stream file are made to correspond and a reproduction list file in which one or more reproducing interval data which designates a reproducing interval by setting a reproduction start point and a reproduction end point for said stream file is stored and in which mark information showing the reproducing time information for said stream file can be stored; and a control step of controlling said recording step and said management information forming step, in which in said control step, said recording step is controlled so as to record said video data and said audio data corresponding to an interval between the recording start and the recording stop based on the instructions in said recording instruction input step as said one stream file onto said recording medium and said management information forming step is controlled so as to form said reproducing interval data which designates said one whole stream file as a reproducing interval and store said mark information showing time information corresponding to reproduction start time which is designated by said reproducing interval data into said reproduction list file.

10. An image pickup apparatus for multiplexing video data obtained by photographing an object by an image pickup unit and audio data obtained by collecting an audio sound by a sound collecting unit and recording the multiplexed data onto a recording medium, comprising:

said image pickup unit configured to photograph the object and output the video data;

said sound collecting unit configured to collect the audio sound and output the audio data;

a recording unit configured to multiplex said video data and said audio data and record a multiplexed stream as a stream file onto the recording medium;

an operating unit configured to receive a user operation for instructing a start and a stop of the recording of said video data and said audio data to said recording medium;

a management information forming unit configured to, for said stream file recorded onto said recording medium, form an attribute file in which at least reproducing time information and address information of said stream file are made to correspond and a reproduction list file in which one or more reproducing interval data which designates a reproducing interval by setting a reproduction start point and a reproduction end point for said stream file is stored and in which mark information showing the reproducing time information for said stream file can be stored; and a control unit configured to control an operation of said recording unit in accordance with the user operation to said operating unit and control said management information forming unit, wherein said control unit controls said recording unit so as to record said video data and said audio data corresponding to an interval between said recording start and said recording stop as said one stream file onto said recording medium in accordance with the operation to said operating unit and controls said management information forming unit so as to form said reproducing interval data which designates said one whole stream file as a reproducing interval and store said mark information showing time information corresponding to reproduction start time which is designated by said reproducing interval data into said reproduction list file.

11. An image pickup apparatus according to claim 10, wherein said control unit controls in such a manner that when said corresponding attribute file is recorded just after said stream file was recorded to said recording medium, said operation for said recording start to said operating unit is not received until the recording of said attribute file is completed.

12. An image pickup apparatus according to claim 10, wherein said control unit controls in such a manner that, on the basis of the instruction of the recording stop by said operating unit, information showing that said stream file and a stream file subsequent to said stream file are continuously reproduced at frame timing is set into said reproducing interval data which designates said recorded stream file as a reproducing interval and said reproducing interval data is recorded onto said recording medium.

13. An image pickup apparatus according to claim 10, wherein said control unit controls said recording unit in such a manner that reproducing time at a head of said video data and reproducing time at a head of said audio data coincide and reproducing time at an end of said audio data is later than reproducing time at an end of said video data.

14. An image pickup apparatus according to claim 10, wherein said control unit controls said management information forming unit in such a manner that when a new stream file has been recorded onto said recording medium, said reproducing interval data corresponding to said new stream file is added to said reproduction list file.

15. An image pickup apparatus according to claim 14, wherein
said control unit
controls so as to form only one said reproduction list file for said one recording medium.

16. An image pickup method for an image pickup apparatus for multiplexing video data obtained by photographing an object by an image pickup unit and audio data obtained by collecting an audio sound by a sound collecting unit and recording the multiplexed data onto a recording medium, comprising:
a recording step of multiplexing the video data obtained by photographing the object by said image pickup unit and the audio data obtained by collecting the audio sound by said sound collecting unit and recording a multiplexed stream as a stream file onto the recording medium by use of a recording unit;
a step of receiving a user operation by use of an operating unit for instructing a start and a stop of the recording of said video data and said audio data onto said recording medium;
a management information forming step of, for said stream file recorded onto said recording medium, forming
an attribute file in which at least reproducing time information and address information of said stream file are made to correspond and
a reproduction list file in which one or more reproducing interval data which designates a reproducing interval by setting a reproduction start point and a reproduction end point for said stream file is stored and in which mark information showing the reproducing time information for said stream file can be stored; and
a control step of controlling an operation in said recording step in accordance with the user operation to said operating unit and controlling said management information forming step by use of a control unit,
wherein in said control step,
said recording step is controlled so as to record said video data and said audio data corresponding to an interval between said recording start and said recording stop as said one stream file onto said recording medium in accordance with the operation to said operating unit and said management information forming step is controlled so as to form said reproducing interval data which designates said one whole stream file as a reproducing interval and store said mark information showing time information corresponding to reproduction start time which is designated by said reproducing interval data into said reproduction list file.

17. A non-transitory computer readable recording memory having stored thereon an image pickup program for allowing a computer apparatus to execute an image pickup method for an image pickup apparatus for multiplexing video data obtained by photographing an object by an image pickup unit and audio data obtained by collecting an audio sound by a sound collecting unit and recording the multiplexed data onto a recording medium,
wherein said image pickup method comprises:
a recording step of multiplexing the video data obtained by photographing the object by said image pickup unit and the audio data obtained by collecting the audio sound by said sound collecting unit and recording a multiplexed stream as a stream file onto the recording medium;
a step of receiving a user operation to an operating unit for instructing a start and a stop of the recording of said video data and said audio data onto said recording medium;
a management information forming step of, for said stream file recorded onto said recording medium, forming
an attribute file in which at least reproducing time information and address information of said stream file are made to correspond and
a reproduction list file in which one or more reproducing interval data which designates a reproducing interval by setting a reproduction start point and a reproduction end point for said stream file is stored and in which mark information showing the reproducing time information for said stream file can be stored; and
a control step of controlling an operation in said recording step in accordance with the user operation to said operating unit and controlling said management information forming step,
in which in said control step,
said recording step is controlled so as to record said video data and said audio data corresponding to an interval between said recording start and said recording stop as said one stream file onto said recording medium in accordance with the operation to said operating unit and said management information forming step is controlled so as to form said reproducing interval data which designates said one whole stream file as a reproducing interval and store said mark information showing time information corresponding to reproduction start time which is designated by said reproducing interval data into said reproduction list file.

\* \* \* \* \*